(12) United States Patent
Gardner et al.

(10) Patent No.: US 11,741,699 B2
(45) Date of Patent: Aug. 29, 2023

(54) METHODS AND APPARATUS FOR DETECTING FEATURES OF SCANNED IMAGES, ASSOCIATING TAGS WITH IMAGES AND/OR USING TAGGED IMAGES

(71) Applicant: Wrethink, Inc., Del Mar, CA (US)

(72) Inventors: James Gardner, Palm Springs, CA (US); Arlene Harris, Del Mar, CA (US)

(73) Assignee: Wrethink, Inc., Del Mar, CA (US)

( * ) Notice: Subject to any disclaimer, the term of this patent is extended or adjusted under 35 U.S.C. 154(b) by 422 days.

(21) Appl. No.: 16/808,363

(22) Filed: Mar. 3, 2020

(65) Prior Publication Data

US 2020/0272862 A1  Aug. 27, 2020

Related U.S. Application Data

(63) Continuation-in-part of application No. 16/799,795, filed on Feb. 24, 2020.
(Continued)

(51) Int. Cl.
*G06K 9/46* (2006.01)
*G06V 20/10* (2022.01)
(Continued)

(52) U.S. Cl.
CPC ............ *G06V 20/10* (2022.01); *G06F 18/213* (2023.01); *G06F 18/2193* (2023.01);
(Continued)

(58) Field of Classification Search
CPC .... G06K 9/6265; G06K 9/6232; G06V 10/40; G06V 2201/10; G06V 20/70; G06V 20/10
See application file for complete search history.

(56) References Cited

U.S. PATENT DOCUMENTS 5,809,493 A * 9/1998 Ahamed ............... G06N 5/025
706/52
7,653,592 B1 1/2010 Flaxman et al.
(Continued)

FOREIGN PATENT DOCUMENTS

| CA | 2850883 A1 * | 11/2014 | ....... G06F 16/24578 |
| EP | 3502979 A1 * | 6/2019 | ............. A61B 5/349 |
| WO | WO-2018014109 A1 * | 1/2018 | ............. G06F 16/00 |

OTHER PUBLICATIONS

Automatic land cover classification of geo-tagged field photos by deep learning, Guang Xu et al., ELSEVIER, 2017, pp. 127-134 (Year: 2017).*
(Continued)

*Primary Examiner* — Jayesh A Patel
(74) *Attorney, Agent, or Firm* — Straub & Straub; Michael P. Straub; Stephen T. Straub

(57) ABSTRACT

Methods and apparatus for using one or more feature recognition system(s) to identify features in a scanned image and to associate tags with identified features are described. Probabilities of a feature being present are taken into consideration in some embodiments. In various embodiments once a tag has been determined as corresponding to a feature which has been confirmed as being in the scanned image synonyms for the tag word are identified and also associated with the scanned image. By using results of multiple automated feature recognition systems and generating overall probabilities that a feature is present in an image more reliable tagging can be implemented in an automated manner than in system which rely on a single AI system without the need for extensive operator input with respect to identification of all features in the image which are to be tagged.

25 Claims, 19 Drawing Sheets

Related U.S. Application Data

(60) Provisional application No. 62/813,134, filed on Mar. 3, 2019, provisional application No. 62/813,091, filed on Mar. 3, 2019, provisional application No. 62/809,716, filed on Feb. 24, 2019.

(51) Int. Cl.
*G06V 10/40* (2022.01)
*G06F 18/21* (2023.01)
*G06F 18/213* (2023.01)
*G06V 20/70* (2022.01)

(52) U.S. Cl.
CPC .............. *G06V 10/40* (2022.01); *G06V 20/70* (2022.01); *G06V 2201/10* (2022.01)

(56) References Cited

U.S. PATENT DOCUMENTS

| | | | |
|---|---|---|---|
| 8,649,602 B2 * | 2/2014 | Tang | G06F 16/5866 382/181 |
| 2002/0077986 A1 | 6/2002 | Kobata et al. | |
| 2007/0240203 A1 | 10/2007 | Beck | |
| 2009/0083332 A1 * | 3/2009 | Datta | G06F 16/58 |
| 2014/0184843 A1 * | 7/2014 | Campbell | G06V 30/1983 348/222.1 |
| 2014/0201126 A1 * | 7/2014 | Zadeh | A61B 5/165 706/52 |
| 2015/0220786 A1 * | 8/2015 | Fol | G06F 18/40 382/181 |
| 2016/0072771 A1 | 3/2016 | Krietzman | |
| 2017/0243125 A1 * | 8/2017 | Thomas | G06N 7/01 |
| 2018/0083771 A1 | 3/2018 | Bonnell | |
| 2019/0051398 A1 * | 2/2019 | Zankowski | G06N 20/00 |
| 2019/0228174 A1 | 7/2019 | Withrow et al. | |
| 2020/0042645 A1 * | 2/2020 | Douthit | G06Q 40/10 |
| 2020/0050842 A1 * | 2/2020 | Kim | G06V 40/67 |
| 2020/0052882 A1 | 2/2020 | Tummalapenta et al. | |
| 2020/0090012 A1 * | 3/2020 | Darnell | G06N 3/045 |
| 2021/0012164 A1 * | 1/2021 | Qiao | G06V 10/7715 |

OTHER PUBLICATIONS

Context-based Image Semantic Similarity, Valentina Franzoni et al., IEEE, 2015, pp. 1280-1284 (Year: 2015).*

Exploiting Web Images for Semantic Video Indexing Via Robust Sample-Specific Loss, Yang Yang et al., IEEE, 2014, pp. 1677-1689 (Year: 2014).*

Fully automated—colitis, Yasuharu Maeda et al., Gastrointestinal endoscopy, vol. 89, 2019, pp. 408-415 (Year: 2019).*

Notification of Transmittal of The International Search Report and The Written Opinion of The International Searching Authority or the Declaration, International Search Report and Written Opinion of the International Searching Authority from PCT/US 2020/020852, dated May 28, 2020 1-9 pages.

* cited by examiner

| FIGURE 11A |
|---|
| FIGURE 11B |
| FIGURE 11C |

METHODS AND APPARATUS FOR DETECTING FEATURES OF SCANNED IMAGES, ASSOCIATING TAGS WITH IMAGES AND/OR USING TAGGED IMAGES

RELATED APPLICATIONS

The present application claims the benefit of the filing date of U.S. Provisional Patent Application Ser. No. 62/813,091 which was filed Mar. 3, 2019, U.S. Provisional Patent Application Ser. No. 62/813,134 which was filed Mar. 3, 2019, and is a continuation in part of U.S. patent application Ser. No. 16/799,795 which was filed on Feb. 24, 2020 and which claims benefit of U.S. Provisional Patent Application Ser. No. 62/809,716 which was filed Feb. 24, 2019 and wherein each of the preceding applications are expressly incorporated by reference in their entirety.

FIELD OF THE INVENTION

The invention relates to feature detection and image tagging and, more particularly, to methods and apparatus for determining features in one or more scanned images, associating tags with scanned images and/or using tagged images.

BACKGROUND

Images may be, and often are, scanned for a variety of purposes. In many cases the scanned images are photos. The photos may be personal photos to be archived for personal reasons or photos of a more general nature scanned for other reasons.

While the scanning of photos can be a quick and simple process, once digitized the photo can be stored with numerous other photos. To later identify a scanned photo, one may need to search through hundreds of photos to find one the user is looking for.

To facilitate later identification and retrieval, e.g., using a word based search, a tag indicating a feature of the photo may be associated with the photo. Tagging of photos can be a labor intensive and time consuming processes since it often involves a human looking at a photo and associating one or more tags, e.g., words, with the photo, by typing in the word to be used as a tag.

While having a human manually tag a photo based on features the user observes and/or considers significant in the photo is one approach to tagging photos, such a fully human based approach suffers various problems in addition to being labor intensive. Among the problems is that in having a single human tag a scanned image such as a photo, the user may miss one or more features that someone else might consider of interest. In addition, the vocabulary of the user doing the tagging may affect the word used for the tag or tags being used for a feature. Thus a person later seeking to find a photo may miss a photo because it was tagged using a word which is different from the word the person seeking to find the photo uses for a feature which was identified by the person doing the tagging but labeled with a different word.

Various commercial systems have attempted to address some of the problems associated with identifying and tagging features in a scanned image. Such systems are often based on Artificial Intelligence (AI) being used to do pattern recognition on a scanned image and then providing a list of words, e.g., tags, corresponding to identified features. In addition to each feature, by providing the tag, e.g., word, corresponding to an identified feature, such systems often provide a probability that the features to which the tag corresponds is in fact present in the image. Unfortunately the reliability of AI systems to identify features is often less reliable than is desirable and often varies from one AI system to another for a variety of reasons including the training data used to train the particular system and/or the feature identification algorithm or neural network used for identification.

Given the less than desirable reliability of individual AI systems at feature detection, for many applications individual AI systems remain insufficiently reliable for automating a feature identification and tagging process.

In view of the above it should be appreciated that there are needs for methods and apparatus for improving feature detection and/or tagging of scanned images for a variety of purposes including, but not limited to, photo achieving applications.

SUMMARY OF THE INVENTION

Methods and apparatus for facilitating the use of automatic feature detection in image processing are described. The methods and apparatus are well suited for use in systems used for detecting features in images and/or tagging scanned image content to indicate features included in the images.

In various embodiments a scanned image is supplied to multiple artificial intelligence (AI) systems which provide feature detection services and which provide a tag corresponding to an identified feature with an indication of the probability that the feature is present in the processed image.

To overcome the unreliability of individual AI systems with regard to accurately detecting features in an image, Bayesian inference techniques are used to process the output of multiple AI systems which independently process the scanned image, e.g., digitized photo.

A Bayesian inference is a method of statistical inference in which Bayes' theorem is used to update the probability for a hypothesis as more evidence or information becomes available. In the case of feature detection is the hypothesis. In Bayesian statistics, the posterior probability of a random event or an uncertain proposition is the conditional probability that is assigned after the relevant evidence or background is taken into account.

In various embodiments the detection, by one AI system, of a feature and the corresponding probability that the feature is present in an image is used as a prior event input to a probability function that also receives a detection confidence value generated by another AI system that detected the same feature in an image. By using multiple different AI systems and processing their confidence of detection of a particular feature, a more reliable confidence score can be generated than using a single AI system since different AI systems suffer from different deficiencies. The resulting confidence score in the form of a posterior density value determined using the output of multiple AI systems can be, and sometimes is, then compared to a threshold to determine if a feature is present.

Accordingly, various features relate to using multiple AI systems and confidence results in combination with Bayesian inference analysis to determine if one or more features are present in an attempt to increase the overall reliability of feature detection and thus facilitate automation of at least some tagging operations by reaching a level of reliability that allows for at least some tags to automatically be associated with a scanned image.

In some embodiments human confirmation of some features prior to associating a corresponding tag with an image is supported. Features subject to human confirmation may, and sometimes do, have an overall detection reliability score below a level used for automatic tag association. Since much of the tagging can be automated and human involvement with individual features is reduced to a subset of features identified by AI processing of the image, the burden of initial feature identification is removed from the human system operator and the human operator is limited in the number of features they need to review/confirm as part of the tagging process.

Other features relate to addressing the problem of what terms should be used for tags and attempt to address the potentially limited or biased vocabulary of the human operator of the system.

In various embodiments once a feature has been identified and a decision made to associate a particular word tag with the image having the identified feature, synonyms for the tag are identified through an automated synonym look up operation. The tag and the synonyms are then associated with the image, e.g., automatically or in some cases after an operator confirms that the synonym should be used as a tag. By performing a synonym lookup operation and association, the risk of an AI systems limited terminology or an operator's limited vocabulary failing to use an appropriate tag once a feature has been identified is reduced as compared to systems which do not add such synonym's.

Various additional features and advantages of the present invention are discussed in the detailed description which follows.

DETAILED DESCRIPTION

Figure 1:
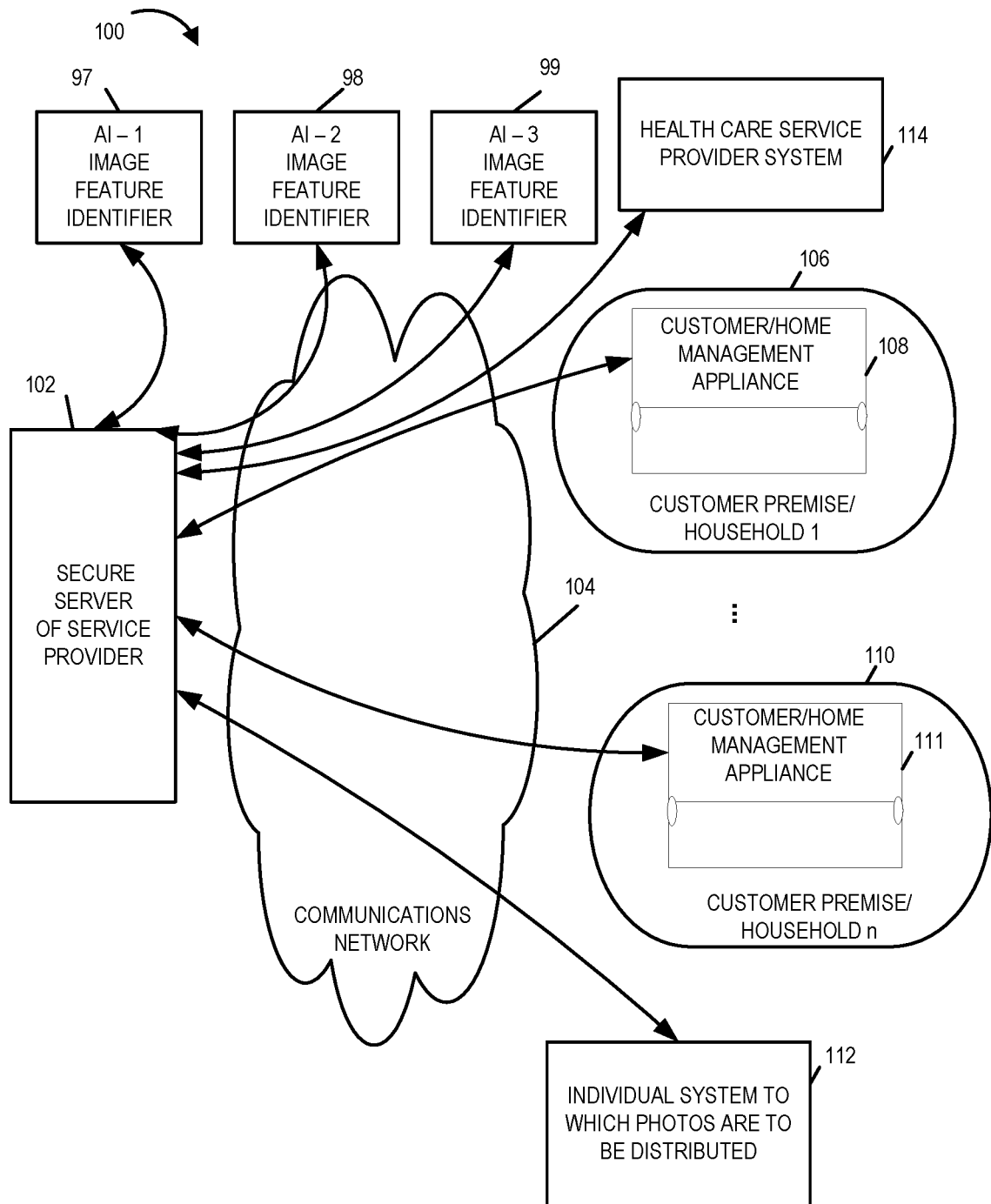
FIG. 1 illustrates an exemplary communications system in which the home appliance and secure server of the present invention may be used.

FIG. 1 illustrates an exemplary system 100 in which one or more appliances, e.g., a home appliances 108, 111 of the invention may be used to input data which can be added to a digital data store. The home appliances 108, 110 can scan images, e.g., documents or photos, and send the scanned images to one or more of the Artificial Intelligence (AI) systems 97, 98, 99 via communications network 104 and/or the secure server 102. In some embodiments the AI systems 97, 98, 99 identify features in the scanned images and report back to the home appliance 108, 111 from which a scanned image was received for processing. The information provided back to the appliance includes a list of identified features, one or more tags, e.g., words, corresponding to each identified feature and a separate confidence probability for each identified feature indicating the probability that the identified feature is in the scanned image. The different AI systems 97, 98, 99 may be, and sometimes are, different commercial systems running different AI processes and/or were trained different image training sets. The AI systems 97, 98, 99 may, and sometimes will, return different feature detection results. As will be discussed below, an appliance 108, 111 can, and sometimes does, processes the results provided by different AI systems 97, 98, 99 to determine what features were consistently determined to be present in a scanned image and what tag or tags, e.g., words, to associate with the scanned image when it is stored in memory to thereby facilitate word searching of images and/or image retrieval. Each AI device includes a processor, memory and an input/output interface. The processor controls the AI device to perform feature detection and return feature detection reports including suggested tags and an indication of a confidence level for each detected feature reported back to a device which supplied a scanned image.

The system 100 includes AI devices 97, 98, 99, a secure server 102 of a provider of a service, e.g., a home information and/or communications management service, a health care service provider system 114, an individual system 112 to which photos and/or other data is to be distributed and a plurality of customer premise locations 106, 110, e.g., household locations, each of which includes an home appliance 108, 111 implemented in accordance with the present invention. Various elements of the system 100 are coupled together via a communications network 104 which may be the Internet, a public telephone network, or a combination of one or more networks. While the communications network 104 may be a public network, communications links over the network may, and in various embodiments are, secured using encryption and/or other techniques. The communications links between the home appliances 108, 111 may be Virtual Private Network (VPN) communications links. Access to other systems, e.g., the health care service provider system 114, Internet search provider systems, E-mail systems, etc. via the home appliance may be protected by a firewall included in or managed by the service provider's secure server 102. The secure server 102 supports various functions and can interact with the home appliances 108, 111 of the present invention to provide a wide variety of services, information management functions, device information synchronization functions, communication service management functions, etc. in a secure manner. The services/functions supported by the secure server 102 include one or more of the following: i) media (e.g., image/film/document) archiving, documenting and distribution functions, ii) video phone service; iii) conferencing and on-line collaboration functions, e.g., allowing for simultaneous document viewing of documents or images by users each of which has an appliance of the present invention; iv) monitoring functions such as health monitoring functions; v) communications service management functions, vi) device data synchronization functions; and vii) household bulletin board functions, etc.

Figure 2:
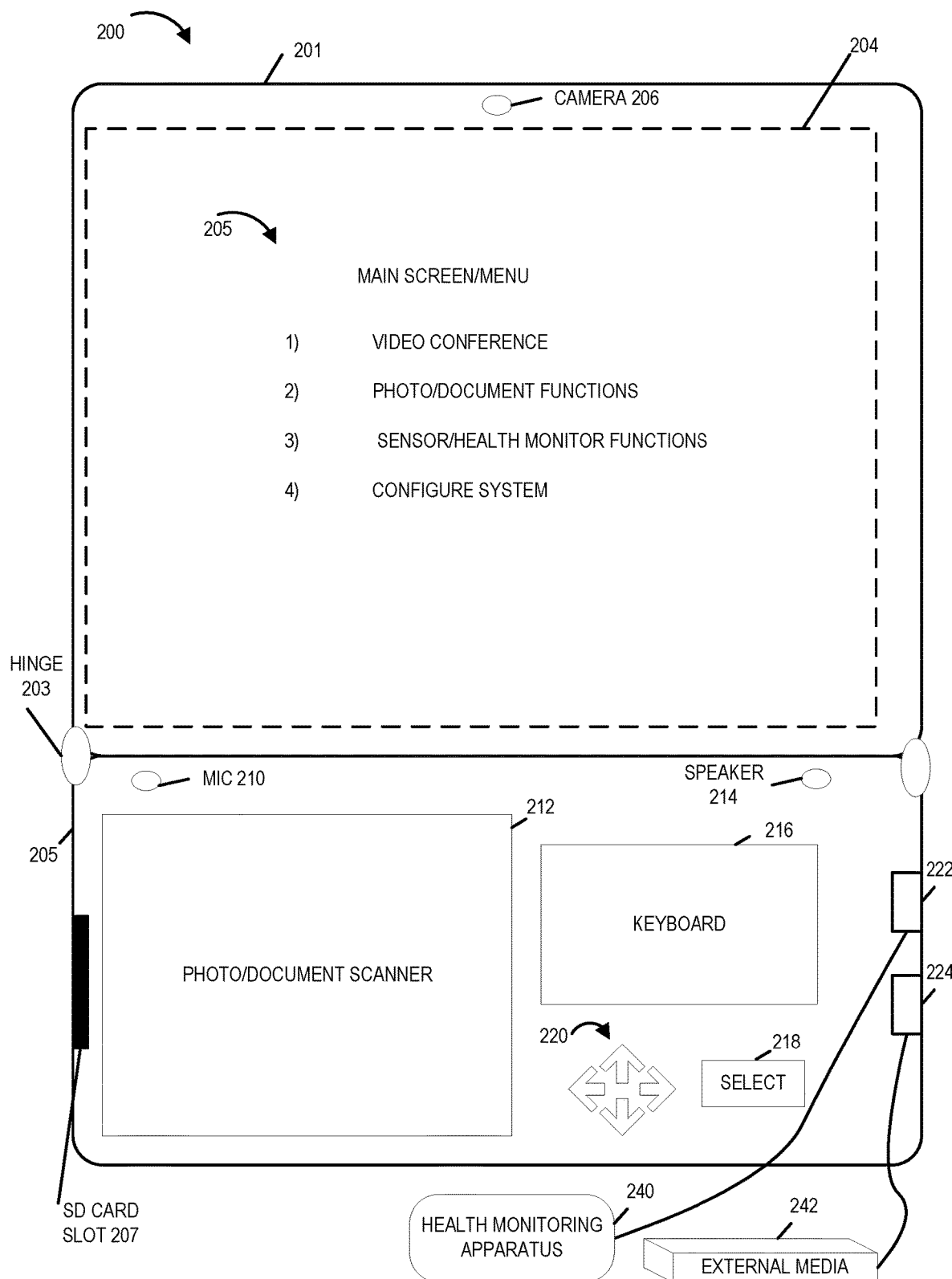
FIG. 2 illustrates an exemplary home appliance implemented in accordance with the invention which may be used in the system of FIG. 1.

FIG. 2 illustrates an exemplary table top household appliance 200 implemented in accordance with the invention. The household appliance 200 includes a housing (201, 205 in combination) which is formed by an upper housing portion 201 and a lower housing portion 205 coupled together by a hinge 203. Mounted to the housing, and thus integral therewith, is a camera 206, display screen 204, a memory card slot 207, photo/document scanner 212, microphone 210, speaker 214, optional keyboard 216, arrow keys 220, select key 218 and various interfaces 222, 224. The display screen 204 may be, and in some embodiments is, a color touch screen. In various touch screen embodiments, keyboard 216 may be omitted. The interfaces 222, 224 may be wired interfaces, wireless interfaces and/or a combination of wired and wireless interfaces. In the case of wireless interfaces, the interface 222 or 224 may include both receiver and transmitter circuitry for receiving and transmitting signals. Internal to the appliance 200, and thus not visible in the FIG. 2 illustration, is a processor and memory. The processor controls operation of the device under direction of one or more modules, e.g., routines, stored in memory. The memory may also be used to store document images, photo images, etc. However, in order to keep implementation costs low, in some embodiments the apparatus 200 includes a relatively small amount of memory with the appliance relying on network connectivity and network storage for data intensive functions such as storing large photo albums and/or large numbers of documents. Additional storage can be added to the apparatus by inserting a memory card, e.g., SD, XD or other type of memory card, in card slot 207 or by attaching an external media device 242, e.g., a USB hard disc drive, to one of the I/O interfaces 222 or 224. The table top appliance 200 can, and sometimes does, perform optical character recognition and then perform various asset ownership and/or asset management/access control functions based on the scanned or user provided input. In other embodiments the device 200 communicates scanned documents and/or user input.

Various peripheral devices, e.g., a health monitoring apparatus 240, may be added to, e.g., coupled to, the appliance 200, to supplement the stand alone appliance's capabilities. Various peripheral devices used in some embodiments include one or more of the following: a media reader such as one or more of the following: a slide reader, a cassette recorder reader (audio or video), a floppy disk reader, a 78 record playback drive, a reel to real tape reader, a film reader. The various readers digitize analog input which is then processed and stored in digital form, e.g., in one or more files and/or communicated via a communications network, e.g., to a network server for storage and/or distribution.

In some embodiments, where healthcare is supported, the appliance 200 is coupled to a monitoring apparatus for monitoring one or more sensor inputs. The sensor inputs may include one or more human health monitors, motion monitors and/or a variety of environmental condition monitors such as security sensors, temperature sensors, etc. A blood pressure monitor, glucose level monitor, heart rate monitor, and blood oxygen level monitor are amount the various sensors and monitors which are used and supported in some embodiments. In some embodiments interface 222 is coupled to a sensor network from which the appliance 200 receives signals used to detect at least one of movement and proximity of a living being.

In some embodiments the appliance 200 is configured to generate an alarm and automatically initiate an audio/video conference in the event motion is not detected at predetermined intervals or during a monitoring period determined according to a programmed schedule. For example, the device 200 may be set to detect motion in the morning and, failing to detect the motion may set off an alarm based on the concern that the resident may have been unable to get up or make to the room in which the appliance 200 is located to take medication at a scheduled time. The device 200 may be set to monitor for audio alarms, e.g., a person yelling for help, or for an alarm signal which may be transmitted to the device 200 by an item worn on an individual expected to use the appliance 200. In the event of an alarm condition, the appliance 200 may initiate a video conference call in which audio as well as video may be monitored and an individual at the customer premise at which the appliance 200 is located may communicate with an individual at another location, e.g., monitoring location, without having to get up or move, through the automatic use of the microphone (mic) 210 and speaker 214.

In the FIG. 2 example, display 204 illustrates an exemplary opening menu 205. The appliance 200 may be preconfigured to display the opening menu upon power up. The menu 205 lists various selection options including a first option corresponding to a video conference function, a second option corresponding to various photo and/or document functions, a third option relating to sensor and/or health monitoring functions and a fourth option relating to system configuration. Each of the functions may be highlighted by moving around on the screen using arrow keys 220 and by pressing select key 218 to indicate a user selection. Alternatively, in touch screen embodiments, a user of the appliance may select an option by touching the portion of the display screen 204 on which the desired option is displayed.

Upon selection of the video conference option, a user is presented with an additional screen that allows a user to initiate or join a video conference, e.g., by entering an identifier corresponding to a party or parties which are to be contacted or by accepting a received invitation to join a video conference initiated by another party, e.g., an individual using another appliance 200 of the present invention.

Upon selection of the photo/document functions option, a user is presented with a menu that allows the user to maker further selections relating to the scanning of photos or documents including the optional recording of voice commentary and an image of the individual providing the commentary, e.g., as part of creating an electronic collection of photos or documents, e.g., an album, which can be uploaded to a server, stored on the server and/or distributed by the server. Given the limited memory on the appliance 200, in some embodiments individual images and documents, along with any commentary or image of the person providing the commentary, are uploaded to a server via a network interface with the server then storing the multiple images and compiling them into albums in accordance with input received from the appliance 200.

Upon selection of sensor/health monitor functions, the user is provided with additional options and supported actions relating to the sensors and/or health monitoring peripheral device 240 coupled to the appliance 200. The appliance 200 supports automatic detection and configuration of peripheral devices. Accordingly, as a user adds or removes peripheral devices the options available upon selection of the sensor/health monitoring functions option will change depending on the sensors/health monitoring apparatus present at a particular point in time.

Upon selection of the configure system option, a user is provided with various configuration options, e.g. display and other setting options. A user may provide a security key, e.g., a Wired Equivalent Privacy (WEP) key, required to obtain wireless connectivity to a local network via setting entry options presented after the configure system option is selected. While a user may configure the appliance 200 manually, the device can also be configured remotely, e.g., by a server in the network to which the apparatus 200 is connected. A telephone interface and pre-programmed telephone number may be included in the apparatus 200 for obtaining configuration information via the public telephone network. However, where wireless or other Internet connectivity is supported, the appliance may connect via such a connection to a network based server to obtain additional or updated configuration information or to download new application software, e.g., relating to one or more peripheral devices which may be added to the apparatus 200.

Figure 3:
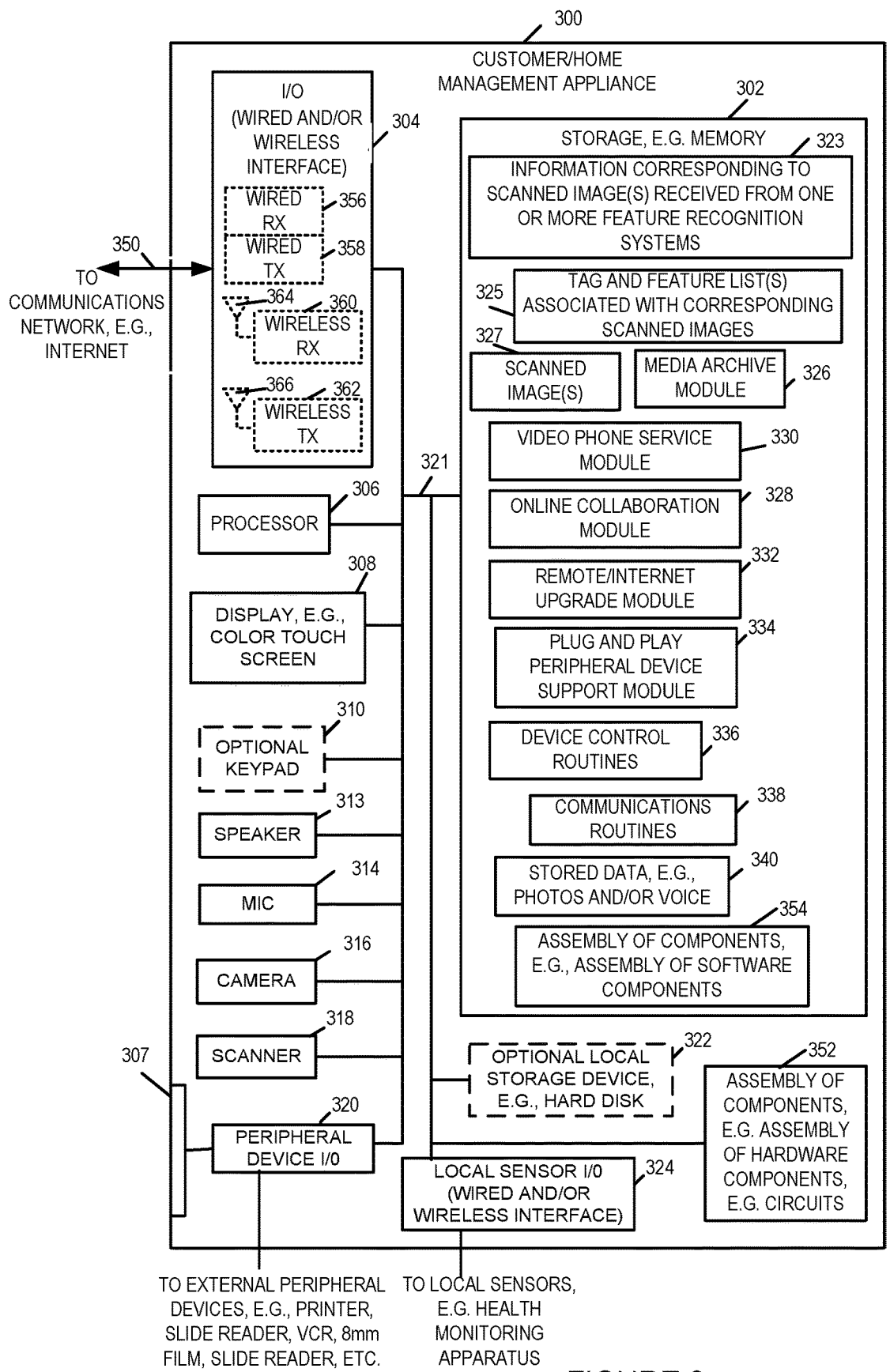
FIG. 3 is a more detailed illustration of the exemplary home appliance shown in FIG. 2

FIG. 3 illustrates, in block diagram form, a customer/home management appliance 300 implemented in accordance with one exemplary embodiment of the present invention. The appliance 200 may include the same elements as the appliance 300 shown in FIG. 3. The appliance 300 includes a input/output interface 304, processor 306, assembly of components 352, e.g. assembly of hardware components, e.g., circuits, display 308, optional keypad 310, speaker 313, microphone 314, camera 316, scanner 318, peripheral device I/O 320, memory 302, optional local storage device 322 and a local sensor I/O 324 coupled together by a bus 321 which allow the various components to exchange data and other signals. The various components are securely, e.g., permanently, mounted to a housing and thus are integral to the appliance 300. The housing may be a single fixed assembly or a multi-part housing such as the multipart housing including upper and lower parts 201, 205 shown in the FIG. 2 example.

The I/O module 304 severs as a network interface and couples the appliance 300 to a communications network, e.g., the Internet and/or public telephone network as indicated by communications link 350. The I/O 304 may be implemented as a wired and/or wireless interface. In some embodiments, the I/O interface 304 includes a wired receiver (RX) 356 and a wired transmitter (TX) 358. In some embodiments, the I/O interface 304 includes a wireless receiver (RX) 360 coupled to receive antenna 364 and a wireless transmitter (TX) 362 coupled to transmit antenna 366. In one embodiment the I/O 304 includes an Ethernet port for connection to wired networks, a telephone jack for connection to standard telephone networks and also a wireless interface, e.g., a WiFi interface for connecting to a wireless network. Other types of network interfaces can be supported such a conventional cell phone interfaces thereby allowing the customer appliance to communicate with other devices and network servers using any one of a wide variety of communications networks.

Processor 306, e.g., a CPU, controls operation of the customer appliance 300 in accordance with one or more control routines stored in memory 302. The processor 306 controls, among other things, the presentation of menus and prompts on display 308 and the disposition of scanned images and/or other files in accordance with user input, e.g., menu selections and destination information, which may be entered by a user of the customer appliance 300. The display screen 308 is used for displaying menus, scanned images, and other information. In some embodiments the display screen 308 is implemented as a color touch screen. In touch screen embodiments the keypad 310 may be omitted. Accordingly the keypad 310 is shown as an optional element. In order to provide audio output, e.g., to allow for the playback of recorded commentary and/or to support audio output as part of a video conference call, the appliance 300 includes speaker 313. To support capture of audio, e.g., to allow for recording of picture commentary and/or the input of voice as part of a video conference call, the appliance 300 includes microphone (mic) 314.

Camera 316 is provided for capturing still images and/or video of the user of the appliance 300. In the case of commentary provided relating to a scanned photo, the camera can, and in some embodiments is, used to capture an image or video of the person providing the commentary. The camera also supports video capture enabling video conference calls from the appliance 300. The camera 300 is usually mounted at a location on the appliance housing from which the image of a user of the appliance can be easily captured. In some embodiments, the camera 316 is mounted above the display screen 308 as shown in FIG. 2.

Scanner 318 allows photos to be scanned. Scanned images may, and in some embodiments are, automatically reoriented prior to display thus allowing an image to be scanned in any direction with the appliance re-orienting the image after scanning. In some embodiments scanner 318 is implemented as a small flatbed scanner capable of scanning 3×5 images. Such a size is well suited for standard photos. Larger scanning bed sizes may also be used. In other embodiments the scanner is implemented as a device having a slot or feed input and the item to be scanned is moved over a scanning area. Accordingly, depending on the particular embodiment, the scanner 318 may be implemented in different formats. The scanner 318 can be used a document scanner allowing documents to be scanned and displayed as part of a video phone conference.

The peripheral device input/output interface 320 serves to interface the device 300 with a variety of external optional peripheral devices as well as a memory card slot 307. The memory card slot 307 allows for memory cards often used for the storage of photos to be read and/or written. Thus, not only can the appliance 300 be used to document and archive physical photos which can be scanned, but can also be used to add commentary to images which were captured by a modern digital camera. Thus, the appliance 300 remains relevant and useful even as a user may migrate from film and photos to electronic cameras and electronic photos.

Among the peripheral devices which are supported by the interface 320 are various optional peripheral devices such as a printer, slide reader, VCR, 8 mm film reader, slide reader, etc. These peripheral devices may be purchased by a user at the time of purchase of the appliance or later, e.g., on an as needed basis. Peripheral devices added to the customer appliance 300 are automatically detected, configured if necessary and the added functionality and menu options made possible by the addition of the peripheral device are automatically added by the appliance 300 to its set of menus. The peripheral device I/O interface 320 may support USB devices. In addition to the interface 320, a sensor interface 324 is provided for receiving local sensor input. The sensor interface 324 may include a wired and/or wireless receiver/transmitter. A large variety of sensors may interface with the appliance via the local sensor I/O interface 324. Sensors which may be coupled to the appliance 300 via interface 324 include, e.g., health monitoring sensors, motion sensors, alarm sensors, etc. As discussed above, peripheral devices in the form of medical sensors may be paid for and coupled to the appliance 300 at any time. Thus, a user of the appliance 300 may purchase the appliance 300 for, e.g., photo and video conferencing functions, and an insurance company may purchase and provide the user a health monitoring device at some later time to be used with the appliance 300, e.g., at the insurer's expense. Health monitoring devices may include blood sugar level monitors, blood pressure monitors, heart rate monitors, etc, which may be coupled to the device 300 via interface 324. Information provided by sensors via interface 324 can, and in various embodiments are, uploaded by the appliance 300 to a network server for forwarding to a health care provider, e.g., a doctor or health insurance provider. Thus, the appliance 300 can be used to support health monitoring functions in addition to supporting video conferencing and photo achieving.

Appliance 300 can, and in some embodiments is, configured to detect various alarm conditions and take action in response to an alarm condition. For example, in response to the failure to detect expected motion, or in response to detecting sudden motion indicative of a fall, the appliance 300 may initiate an audio or video conference with a monitoring service or healthcare provider which can then assess the situation and make an informed decision as to whether or not to send, e.g., dispatch, medical help. Smoke and/or heat sensors may be used to trigger a fire alarm which, like a medical alarm, may trigger a video conference call which can result in emergency service personal being dispatched, e.g., fire fighters and/or police may be dispatched to the customer premise.

For cost reasons the memory 302 may be relatively small. The memory 302 may be non-volatile and can be used to store various modules, e.g., routines, which support various device functions. In addition memory may have the capacity to store a limited number of photos and corresponding audio/video commentary which can then be uploaded to a network storage device via network interface 302.

In the FIG. 3 embodiment, memory includes tag and/or feature lists 325 corresponding to scanned images which may be stored with the associated tag/feature lists in memory portion 325 or in scanned image portion 327, a media archive module 326, a video conference call module 328, an online collaboration module 330, remote/Internet upgrade module 332, a plug and play peripheral device support module 334, device control routines 336, communications routines 338 and stored data 340, e.g., photos and/or audio/video commentary. The information stored in memory portion 325 can be, and sometimes is feature and tag information received from multiple different feature recognition systems with a set of information being stored for each scanned image which was subject to feature recognition and tag list generation processing. Thus in some embodiments 325 includes a separate tag list and/or other information for each individual scanned image stored in memory portion 327.

While memory 302 may be somewhat limited in size for cost reasons, in some embodiments an optional hard disk 322 is included to provide for ample storage for digital images, video and audio on the appliance 300. Cloud or network storage is also supported making optional hard disk 322 less important in cases where reliable network connectivity is available.

Media archive module 326 controls the scanning, documentation (audio and/or video documentation) of images such as photos and physical documents. As discussed above, photos can be scanned, stored in digital form with captured audio and/or video commentary and distributed, e.g., via the network interface 304 under control of media archive module 326. Video conference module 328 is responsible for handling video conference call establishment and video conference call maintenance. On-line collaboration module 330 allows users to establish on-line collaboration sessions which may involve use of the video conference capabilities available from module 328 as well as document exchange capabilities made possible by the availability of the scanner 318. Remote/Internet upgrade module 332 allows for the appliance 300 to exchange data and/or control information with a remote server via a communications network such as the Internet or a public telephone network. Remote upgrade module 332 makes it possible for the routines in memory 302 to be updated, added to or replaced via a remote network server. Thus, new applications and routines may be retrieved and installed automatically, e.g., as new peripheral devices are detected. Plug and play peripheral device support module 334 is responsible for detecting new peripheral devices, retrieving corresponding applications or routines from the network if required, automatically install the retrieved routines and for taking any other action required to automatically support various peripheral devices attached to the customer appliance 300. The plug and play support made possible by module 334 allows a user to add supported peripheral devices without have to be concerned with having to manually configure the appliance 300 to support the peripheral device.

Device control routines 336 include a variety of routines, including alarm generation and detection routines, data storage control routines, etc. that support or control the device to operate in accordance with the methods of the present invention.

Communications routines 338 support voice and data communications and enable communications sessions to be established via the appliance 300. Stored data 340 includes stored photos, voice and/or image data corresponding to commentary relating to scanned or input photos or documents. The stored data may also include menu information and/or other system configuration information. The system configuration information may be preloaded and/or automatically updated as peripheral devices as added and/or the device is reconfigured to support new applications. Updating of configuration information stored in memory 302 may be done automatically by a remote server coupled to the customer appliance 300 via a communications network. Data 340 may include alarm settings which determine when a video conference call is to be initiated, e.g., in response to a fall sensor, heat sensor, smoke alarm or another monitoring device which may supply signals to the customer appliance 300. Storage 302, e.g., memory, further includes an assembly of components 354, e.g., assembly of software components, e.g., software routines and/or software modules.

In view of the above discussion, it should be appreciated that the appliance of the present invention is easy to set up, simple to use, supports a wide variety of applications and can be updated remotely and/or through the addition of add on peripheral devices which can increase the number of supported functions. The appliance of the present invention supports enough functions that it can appeal to a wide range of family members and/or age groups. Since purchase of the appliance can be justified by the many non-health related functions it supports, purchase of the appliance can be motivated without using the health monitoring features as a primary reason to purchase the appliance. Health care providers can cover the cost or supply health monitoring related peripheral devices and can take advantage of the remote reporting and alarm features supported by the appliance thereby potentially reducing the cost of health care services without saddling health insurance companies with the cost of the communications interface and/or network related costs that might be associated with having to provide a complete monitoring system.

Figure 4:
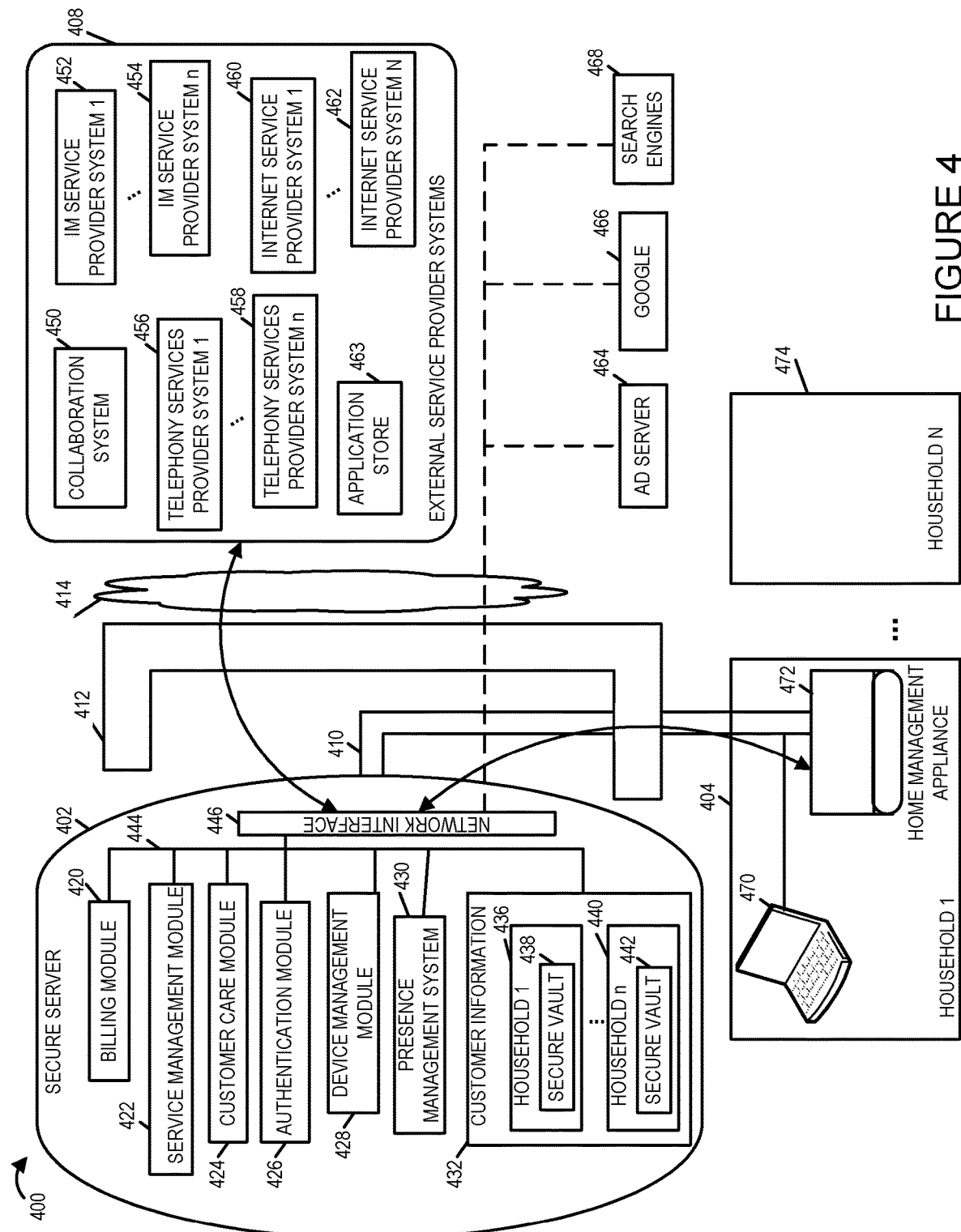
FIG. 4 is another exemplary communications system implemented in accordance with the present invention which includes more detail than is included in FIG. 1.

FIG. 4 illustrates a system 400 implemented in accordance with the present invention in more detail than the FIG. 1 illustration. As illustrated in FIG. 4, a variety of households 404, 474 include a home management appliance 472 implemented in accordance with the present invention and one or more other electronic devices 470 which can be used to access and distribute information, e.g., household member schedule information, contact information, etc.

The households 404, 474 are coupled to the secure server 402 via secure communications links such as the link 410. The secure links may pass over a public communications network such as the network 414, e.g., the Internet or public telephone network, but are secured through the use of one or more security techniques, e.g., encryption techniques. The link 410 may be a VPN communication link. A firewall 412 protects the secure server from security threats and also protects the home management appliance 472 from security threats. Communications from the home management appliance to Internet sites, communications services, E-mail servers, etc. are routed through the secure server 402 and firewall 412 to protect the home management appliance 472 from security threats without imposing the need for the user of the home management appliance 472 to manage or even be aware of the firewall 412.

The software and/or other applications are loaded onto the home management appliance 472 via the secure server 402. In some embodiments the user is prohibited from loading applications or software onto the home appliance 472 except via the secure server 402. Thus, the secure server 402 can check applications before they are loaded onto the home appliance 472 greatly reducing the threat of accidental loading of viruses and also allowing the secure server 402 to make sure that only compatible applications are loaded onto a home appliance 472. The secure server 402 may be responsible for updating appliance settings and configuration as applications are loaded and used in combination on the home appliance 472. Since home appliance configuration and management issues are implemented on the secure server 402 by the service provider, and the household member using the home management appliance 472 is shielded from many device management and configuration issues commonly encountered when software and peripherals are loaded onto or added to personal computers.

The secure server 402 includes various modules in addition to customer information 432, e.g., household information. The modules include a billing module 420, a service management module 422, a customer care module 424, an authentication module 426, a device management module 428, a presence management module 430. The various modules can interact with the home management appliance 472 via network interface 446 and also with other external systems 408 via the interface 446. The customer information 424 includes information 436, 440 corresponding to each of the households 404, 474 serviced by the secure server 402. The household information (household 1 information 436, . . . , household n information 440) includes information stored in a secure manner, e.g., information stored in what is referred to as a secure vault (438, . . . , 442), respectively. The information in a households secure vault may be encrypted and is normally backed up. A secure vault, e.g., secure vault 442, used to store household information, e.g. for household n, may be distributed over a number of storage devices and may be implemented using a secure cloud based storage embodiment and need not be, but may be, implemented using storage internal to the secure server 402.

External service provider systems 408 which may be accessed from the home management appliance 472 via the secure server 402 include a collaboration system 450, one or more telephone service provider systems 456, 458, one or more instant message service provider systems 452, 454, an application store 463, and one or more internet service provider systems 460, 462. Various other external devices such as ad server 464, a Google server 466 and a search engine server 468 may also be accessed via the home management appliance 472 and secure server 402. While not shown in FIG. 4, one or more health care service provider systems 114 may also be accessed via home management appliance 472 and secure server 402.

A secure vault, e.g. secure vault 438, can be used to store medical records, receipts, business records, photos, schedule information, to do lists, etc. with the amount of access to such information being controlled and/or restricted based on information entered via the home management appliance 472 of the household, e.g. household 1 404, to which the secure vault, e.g., secure vault 438, corresponds. A user of the home management appliance 472 can manage a households communications services, including the porting of telephone numbers and change of telephone service providers, directly from the home management appliance 472 by providing change/service management information to the secure server 402. The service provider operating the secure server 402 then contacts the various service providers which need to make changes to implement the requested communications service changes in a secure manner eliminating the need for the user of the home management appliance 472 to directly contact the individual communications service providers affected by the requested change in communications service. E-mail, instant messaging and other communications services used by household members can also be managed in a secure manner form home management appliance 472.

Figure 5:
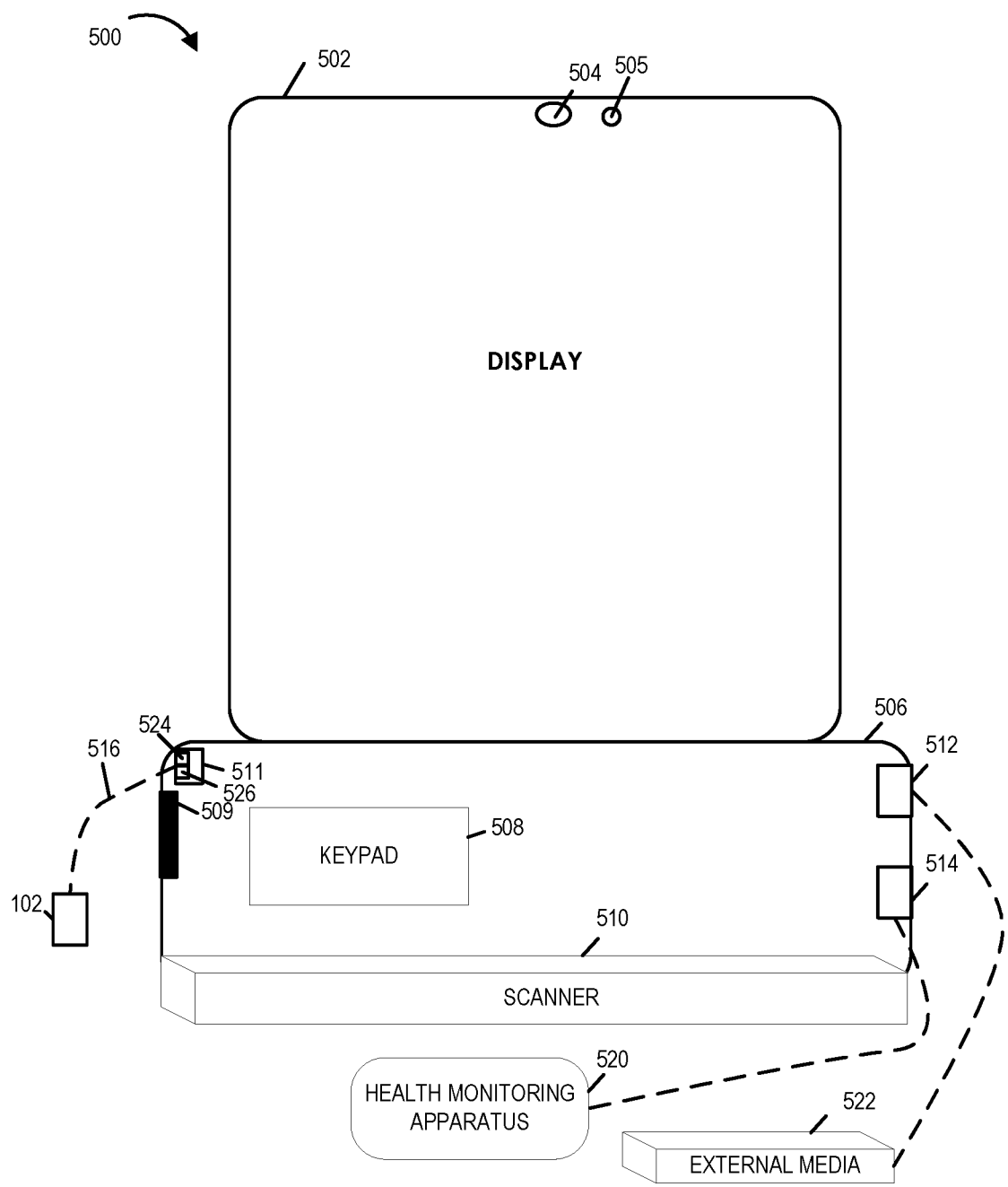
FIG. 5 illustrates a home appliance with a detachable display and scanner implemented in accordance with one exemplary embodiment.

FIG. 5 illustrates a home appliance 500 which may be used as the home appliances shown in FIGS. 1 and 4. The home appliance 500 includes a display 502, base unit 506 and scanner 510. The display device 502 may include a camera 504 and/or microphone (mic) 505 and may be touch sensitive. The scanner 510 may be integrated with the base unit 506 or detachable. The base unit 506 includes interfaces 512, 514 for coupling the base unit 506 to external peripheral devices such as health monitoring apparatus 520 and external media 522. The base unit 506 further includes a memory card slot 509. The base unit 506 also includes an interface 511 for securely coupling the base unit 506 to the secure server 102 via a communications network 516. Interface 511 includes a receiver 524 and a transmitter 526.

Figure 6:
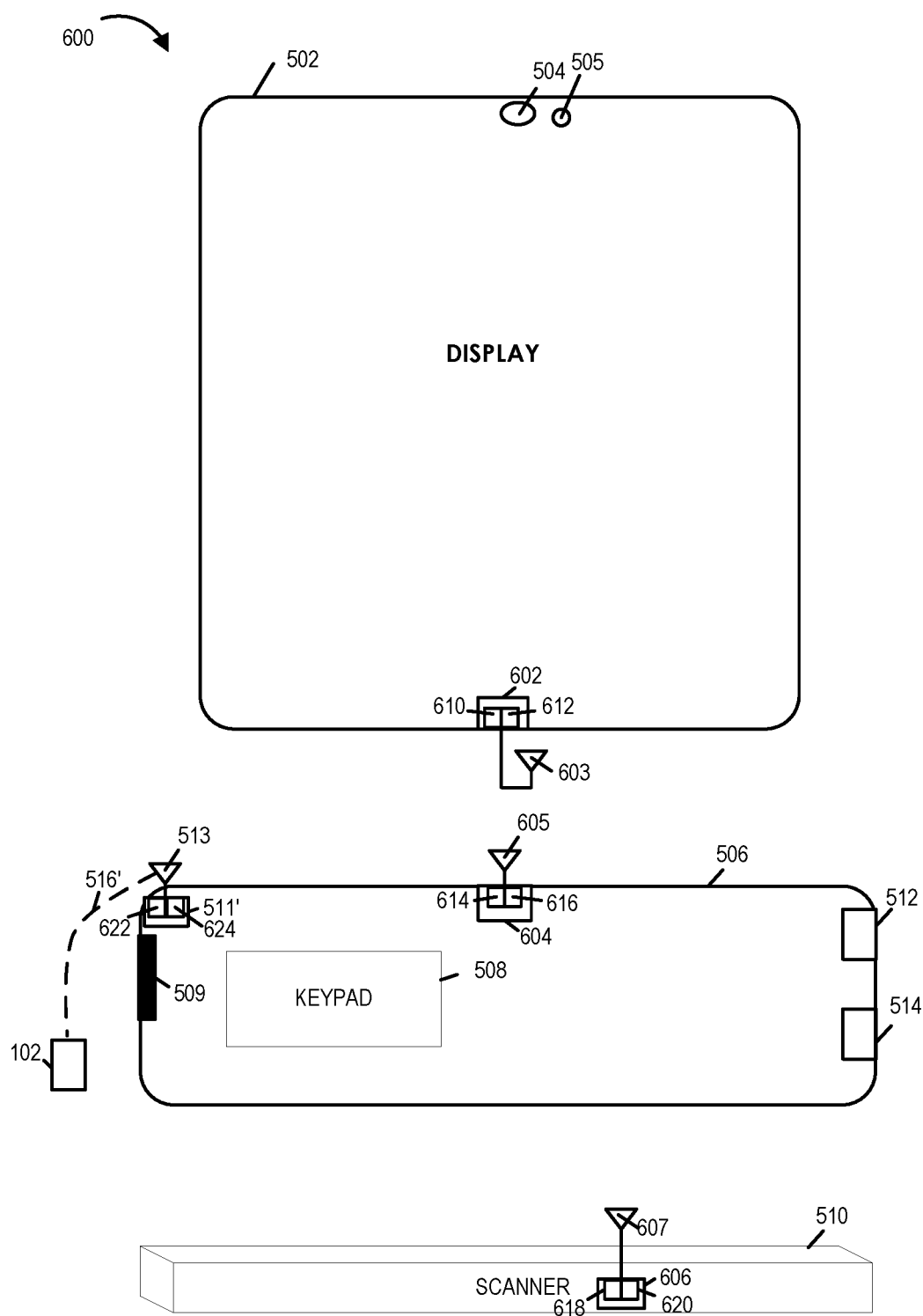
FIG. 6 shows how the components of the system shown in FIG. 5 can be detached from one another and used as they communicate wirelessly with each other.

FIG. 6 illustrates an exemplary home appliance 600 which may be used as the home appliances shown in FIGS. 1 and 4. Exemplary home appliance 600 includes a display 502, a base unit 506 and scanner 510. FIG. 6 shows how, in one embodiment the display 502, base unit 506 and scanner 510 may be detached from one another. The various components (502, 506, 510) may communicate wirelessly with one another, e.g., via wireless interfaces (602, 604, 606), and corresponding antennas (603, 605, 607), respectively. Wireless interface 602 includes a wireless receiver 610 and a wireless transmitter 612. Wireless interface 604 includes a wireless receiver 614 and a wireless transmitter 616. Wireless interface 606 includes a wireless receiver 618 and a wireless transmitter 620. The display device 502 may be a tablet type device including a touch sensitive screen, display capability, some processing capability and the ability to wirelessly interact with the base unit 506, e.g. a base station, and via the base station 506, including wireless interface 511' and antenna 513' and wireless communications link 516', the secure server 102. Wireless interface 511' includes a wireless receiver 622 and a wireless transmitter 624.

Figure 7:
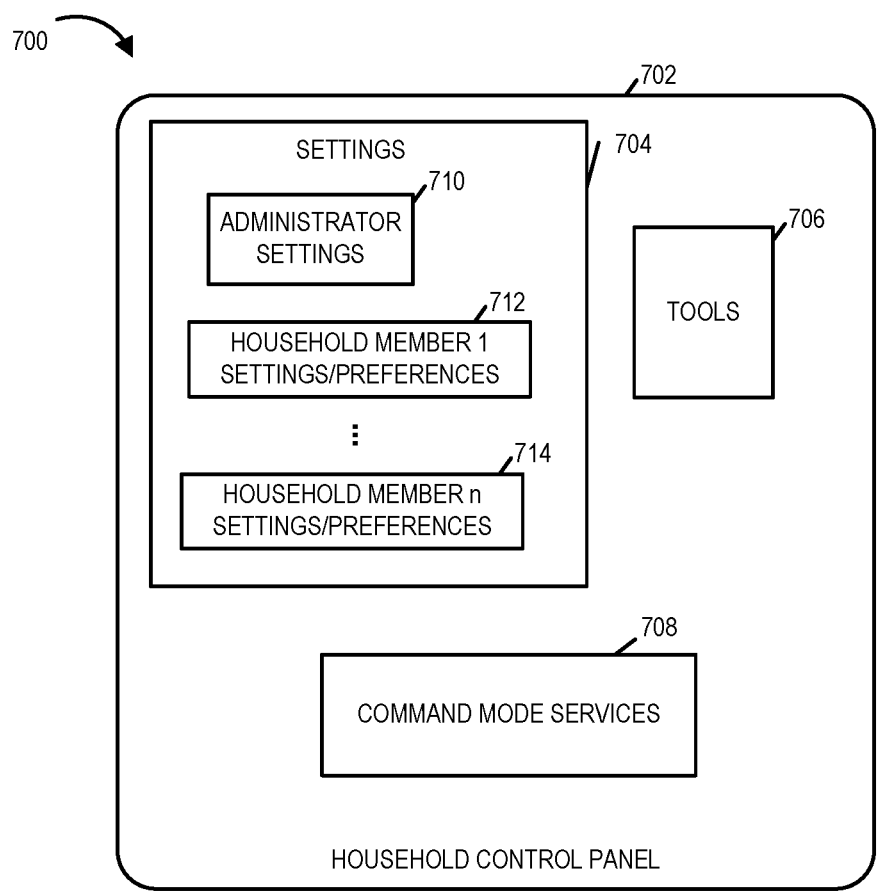
FIG. 7 illustrates a household control panel which may be accessed via the home appliance of the present invention.

FIG. 7 illustrates a household control panel 700 implemented in accordance with one embodiment of the present invention. The household control panel 700 may be displayed on the display 502 and accessed via the home management appliance. Functions and/or services provided via the control panel may be implemented partially or fully on the secure server 102. Exemplary household control panel 700 includes a setting portion 704, a tools portion 706 and a command mode services portion 708. The settings portion 704 includes administrator settings 712, and household settings/preferences corresponding to each household member (household member 1 setting/preferences 712, . . . , household member n settings/preferences 714).

Figure 8:
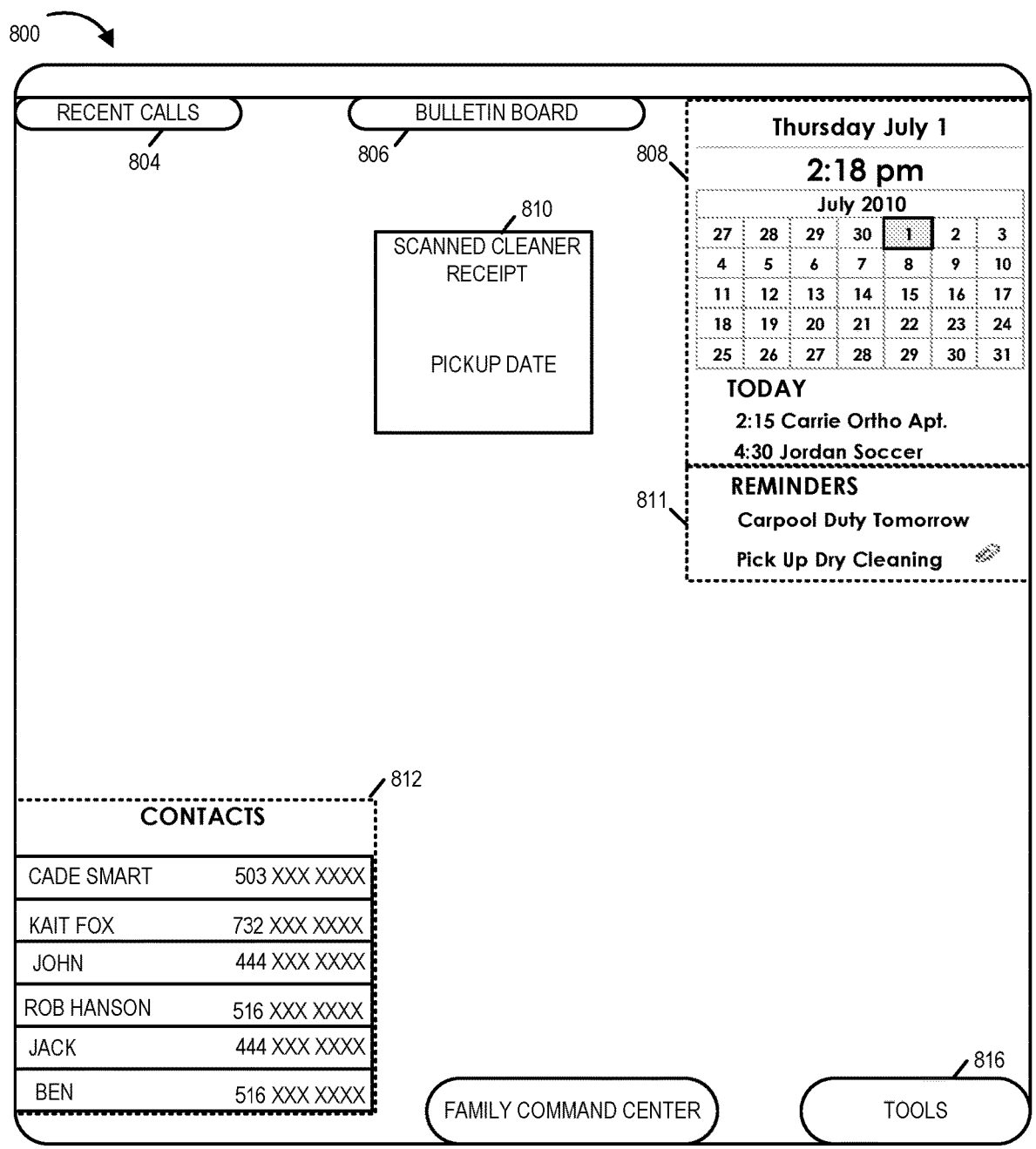
FIG. 8 illustrates a family command and control center screen which may be accessed and used to communicate household information, access household calendars, etc.

FIG. 8 illustrates a family command center 800 which may be displayed on and accessed via the home management appliance. The family command center 800 is an application and corresponding display interface which allows for the management of a wide variety of household information including contacts 812, reminders 811, a calendar 808, scanned receipts 810, call information 804, tools 816 and a bulletin board 806 which can be used for posting notes and/or other information intended for multiple family members.

Figure 9:
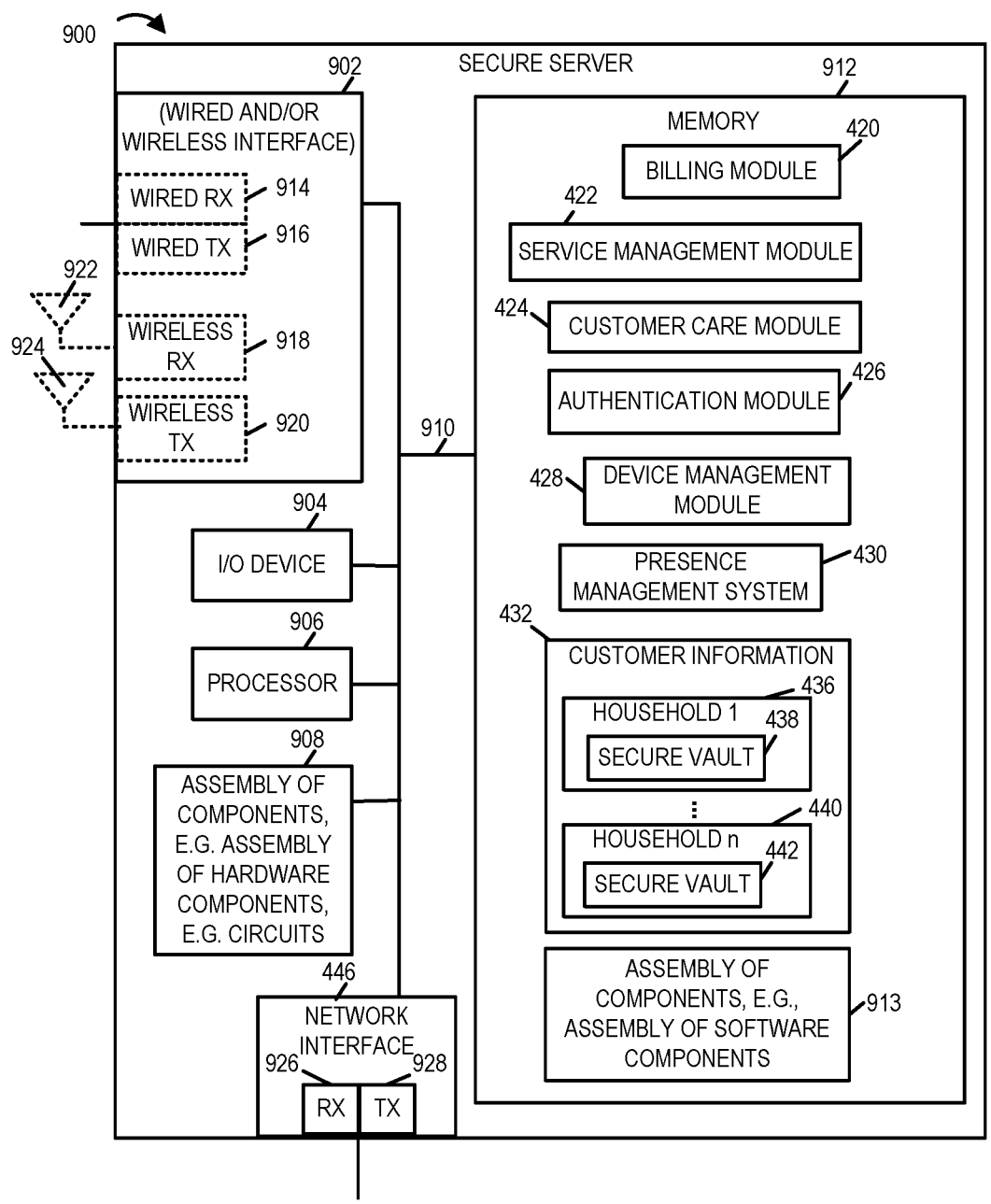
FIG. 9 illustrates a secure server which may be used as the secure server of the system shown in FIGS. 1 and 4, and which interacts with the home appliance in a secure manner to provide a wide range of services to a household and the various members of a household.

FIG. 9 is a drawing illustrating a secure server 900 which may be used as the service provider secure server (102 or 402) of the systems shown in FIGS. 1 and 4. Secure server 900 includes a wired and/or wireless interface 902, I/O device 904, processor 906, e.g., a CPU, assembly of components 908, e.g., an assembly of hardware components, e.g. circuits, network interface 446, an memory 912 coupled together via a bus 910 over which the various elements may interchange data and information. Memory 912 includes billing module 420, service management module 422, customer care module 424, authentication module 426, device management module 428, presence management system 430, customer information 432, and assembly of components 913, e.g., an assembly of software components, e.g. software routines and/or software modules. Customer information 432 including sets of household information corresponding to a plurality of different households (household 1 data/information 436, . . . , household n data/information 440. Household 1 data/information 436 includes secure vault 438. Household n data/information 440 includes secure vault 442.

Wired and/or wireless interface 902 includes one or more or all of: wired receiver (RS) 914, wired transmitter (TX) 916, wireless receiver (RX) 918 coupled to receive antenna 922, and wireless transmitter (TX) 920 coupled to transmitter 924. In some embodiments, the wireless receiver 918 and wireless transmitter 920 use the same antenna or same set of antennas. Network interface 446 includes a receiver (RX) 926 and a transmitter (TX) 928.

Figure 10:
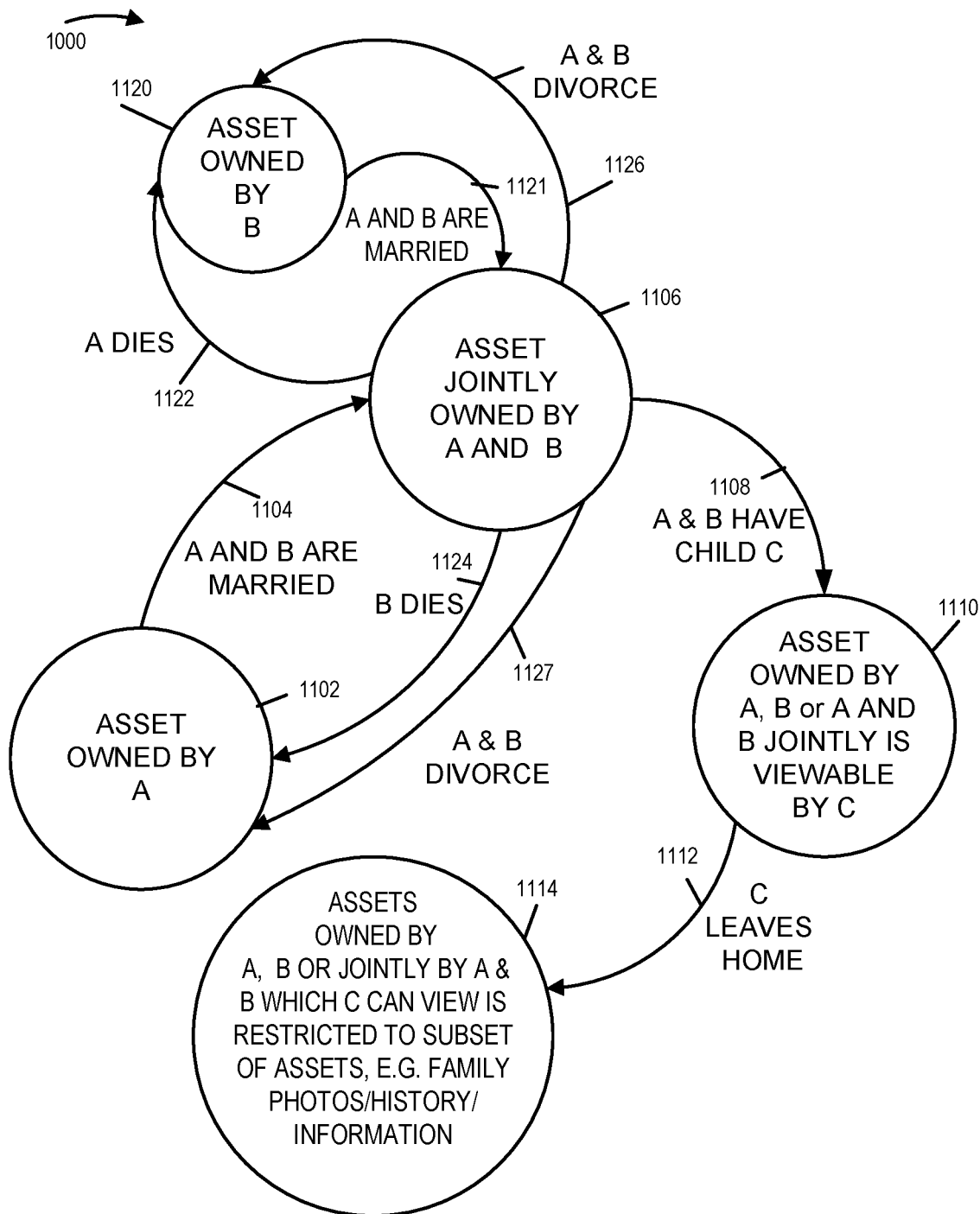
FIG. 10 illustrates how asset ownership and/or access rights may be and sometimes are automatically changed in response to one or more life events that can be specified by a user and/or determined or verified based on one or more scanned documents.

FIG. 10 illustrates how asset ownership and/or access rights may be and sometimes are automatically changed in response to one or more life events that can be specified by a user and/or determined or verified based on one or more scanned documents.

The diagram 1000 shows a variety of asset ownership/access states 1120, 1106, 1110, 1102, 1114 and the corresponding life events that can be indicated by a user and/or automatically detected by scanning a document such as a marriage certificate, death certificate, birth certificate, divorce document, lease indicating a child has moved to a new address. Arrows are used to indicate transitions, e.g., changes in ownership and/or access that can be and sometimes is implemented automatically in response to detection of the corresponding event.

For example state 1120 represents the existence of a set of digital assets which are owned by a person represented by the letter B. Ownership of the stored assets, e.g., records, pictures, legal documents, audio records, etc. transitions in step 1121 to a joint asset ownership state in response to detection of a marriage between individual A and individual B. State 1106 indicates the state of jointly owning assets stored in the digital vault maintained for the family including married individuals A and B. The ownership state of the assets maintained for the coupled A, B changes in response to detecting one or more conditions such as death of individual A, death of individual B or divorce of A& B.

In the case of death of individual A ownership of the assets stored in the digital store that are jointly owned by A and B automatically transitions in step 1122 to ownership by individual B 1120. In the case of death by individual B ownership of assets stored in the digital store that are jointly owned by A and B automatically transitions in step 1124 to ownership by individual A 1102.

In the case of divorce of married couple assets which are jointly owned 1106 are divided between A & B based on previous ownership and/or a divorce document. Steps 1126 and 1127 represent the transition of assets form the joint ownership state 1106 to the individual ownership states 1120, 1102 as a result of divorce.

Detection of a birth or adoption of a child can, and sometimes does, trigger automatic creation of a secure data store in the family digital vault for the child while also automatically granting the child access rights to some or all of the parents data stored in the family data vault, e.g., maintained by the secure server 402. These operations are represented by step 1108.

A child leaving a home, e.g., as indicated by the scanning of a lease with the child's name and new home address on it, can, and sometimes does, trigger an automatic change in the child's right to access content corresponding to his/her parents as represented by step 1112. After a determination is made that a child has left the family home the child is still permitted to access some portions of the family vault, e.g., the portions including general family history, family photos and the child's own personal information but may be, and sometimes is, restricted from access to some other content in the family vault the child had access to prior to leaving the home. The content which the children are to have access to can be, and sometimes are, determined by general rules specified by one or both the parents which can be applied uniformly to one or more children whenever a child is detected on indicated to have left the home.

The ownership and access changes may be, and sometimes are, determined by the customer home appliance 300, e.g., under control of the processor included therein, based on user input and/or one or more scanned documents and then communicated via a communications network to the secure server which maintains the secure family vault. In other embodiments the home appliance or another device provides user input and/or scanned documents to the secure server 402 which then makes asset ownership and/or asset access changes, e.g., in accordance with the diagram of FIG. 10 and/or the method shown in FIG. 11.

Figure 11A:
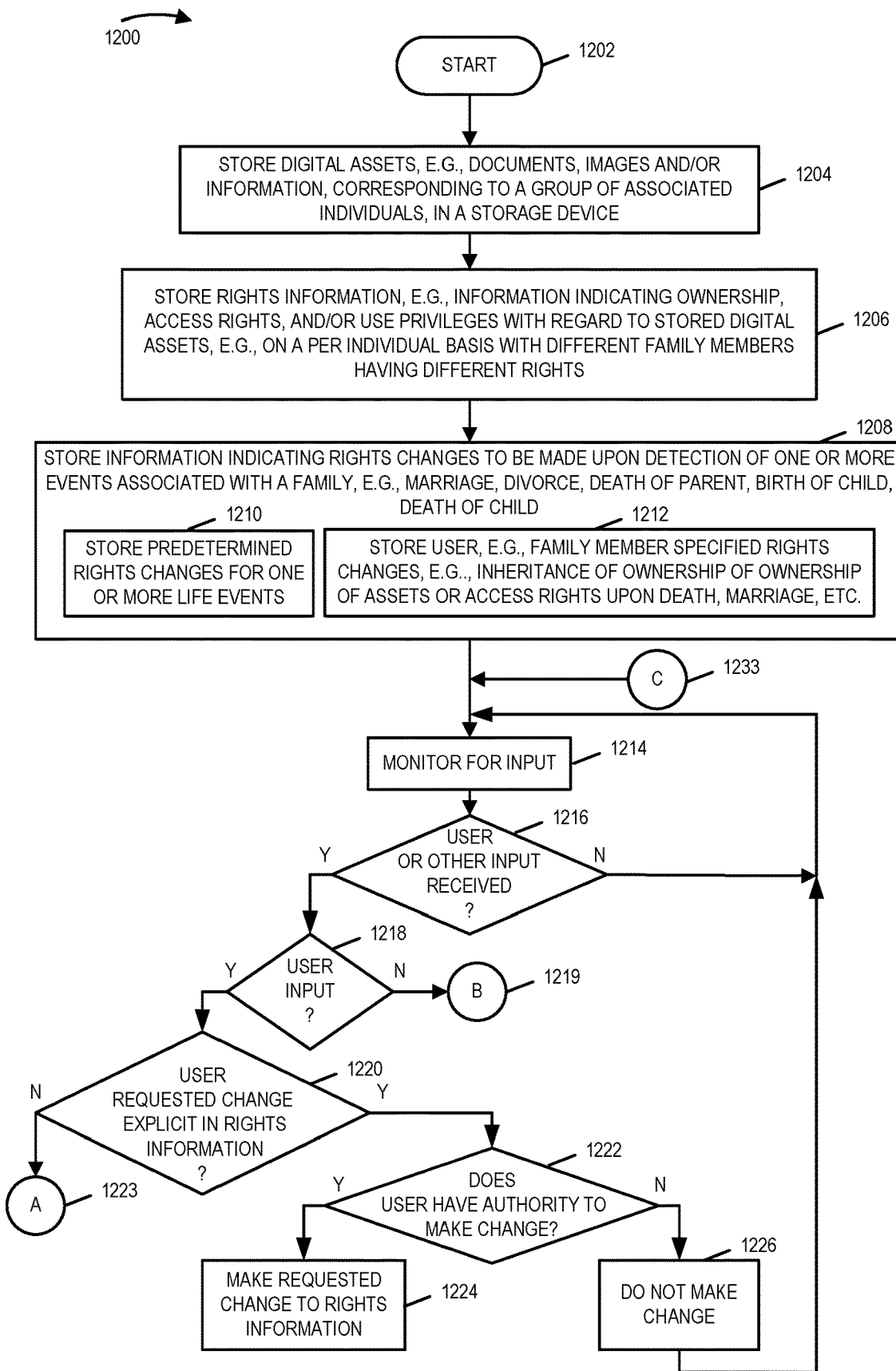
FIG. 11A is a first part of the flow chart of FIG. 11.
Figure 11B:
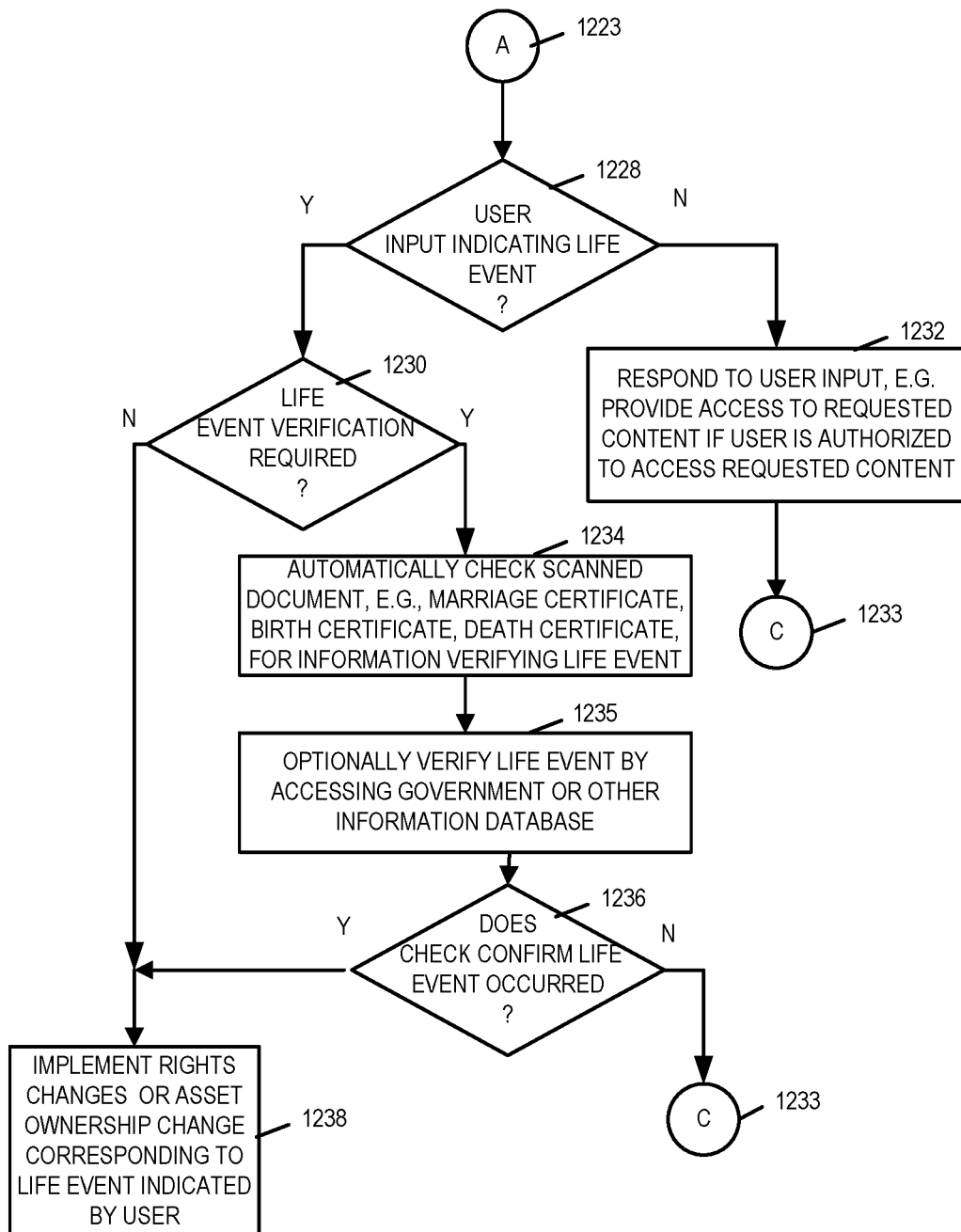
FIG. 11B is a second part of the flow chart of FIG. 11.
Figures 11, 11C:
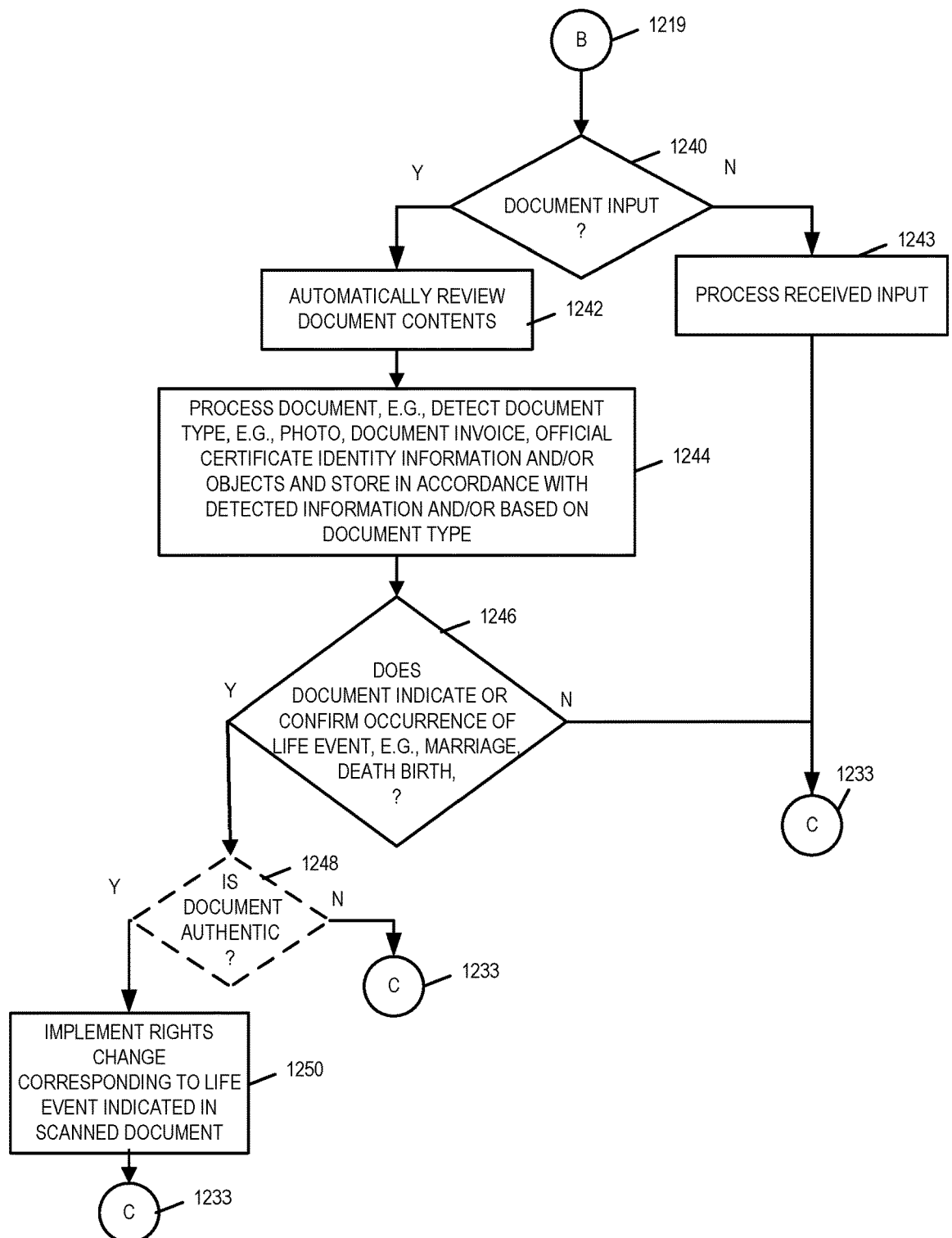
FIG. 11C is a third part of the flow chart of FIG. 11.
FIG. 11 shows how FIGS. 11A, 11B and 11C can be combined to form a flow chart showing steps relating to asset storage, ownership and/or access control which are used in various embodiments of the present invention to manage contents of a digital data store that may be and sometimes is a remote cloud based data store including family information.

FIG. 11 shows how FIGS. 11A, 11B and 11C can be combined to form a flow chart showing steps relating to asset storage, ownership and/or access control which are used in various embodiments of the present invention to manage contents of a digital data store that may be, and sometimes is, a remote cloud based data store including family information.

While document scanning is normally done in a home using a scanner included in or attached to a device in the home, the access control and ownership decisions can be made by the processor of the home device or by the processor of the secure server depending on the particular embodiment.

Thus depending on the particular embodiment one or more of the steps shown in FIG. 11 can be implemented by the home management appliance 472 or another home device and/or by components in the secure sever 402 which controls the secure server to operate in accordance with the invention.

FIG. 11, comprising the combination of FIG. 11A, FIG. 11B and FIG. 11C, is a flowchart 1200 of an exemplary method in accordance with an exemplary embodiment. Operation starts in step 1200 in which an exemplary system, e.g., a system including a secure server, a plurality of household management appliances, and one or more external system provider systems, is powered on and initialized. Operation proceeds from start step 1202 to step 1204.

In step 1204 digital assets, e.g. documents, images and/or information, corresponding to a group of associated individuals, are stored in a storage device. Operation proceeds from step 1204 to step 1206.

In step 1206 rights information, e.g., information indicating ownership, access rights, and/or use privileges with regard to stored digital assets, e.g., on a per individual basis with different family members having different rights, are stored. Operation proceeds from step 1206 to step 1208.

In step 1208 information indicating rights changes to be made based upon detection of one or more events associated with a family, e.g., marriage, divorce, death of parent, birth of child, death of child, e.g., are stored. Step 1208 includes steps 1210 and 1212. In step 1210 predetermined rights changes for one or more life events are stored. In step 1212 user, e.g. family member, specified rights changes, e.g. inheritance of ownership of assets or access rights upon death, marriage, etc., are stored. Operation proceeds from step 1208 to step 1210.

In step 1214 monitoring for input is performed. Operation proceeds from step 1214 to step 1216. In step 1216, if user or other input was received, then operation proceeds from step 1216 to step 1218. However, if no user or other input was received, then operation proceeds from step 1216 to the input of step 1214 for additional monitoring.

Returning to step 1218, in step 1218 if user input was received, then operation proceeds from step 1218 to step 1220; otherwise, operation proceeds from step 1218, via connecting node B 1219 to step 1240.

Returning to step 1220, in step 1220 if the user requested change is explicit in rights information, then operation proceeds from step 1220, via connecting node A 1223 to step 1228; however, if the user requested change is not explicit in rights information, the n operation proceeds from step 1220 to step 1222.

In step 1222 a check is made as to whether or not the user has the authority to make the change. If the check of step 1220 determines that the user has the authority to make the requested change, then operation proceeds from step 1222 to step 1224, in which the requested change to the rights information is made. However, if the check of step 1220 determines that the user does not have the authority to make the requested change, then operation proceeds from step 1222 to step 1226, in which the request change is not made. Operation proceeds from step 1226 to the input of step 1214, in which additional monitoring for input is performed.

Returning to step 1228, a determination is made as to whether or not the received user input is indicating a life event. In step 1228 if the received user input is indicating a life event, then operation proceeds from step 1228 to step 1230; otherwise, operation proceeds from step 1228 to step 1232.

Returning to step 1230, ins step 1230, a determination is made as to whether or not life event verification is required. If life event verification is required, then operation proceeds from step 1230 to step 1234; otherwise operation proceeds from step 1230 to step 1238.

Returning to step 1234, in step 1234 a scanned document, e.g., a marriage certificate, birth certificate, death certificate, etc., is automatically checked for information verifying life event. Operation proceeds from step 1234 to step 1235 in which the life event is optionally verified by accessing a government or other information database. Operation proceeds from step 1235 to step 1236.

In step 1235 a determination is made as to whether or not the check confirmed that the life event occurred. If the determination is that the check confirmed the life event, then operation proceeds from step 1236 to step 1238; otherwise, operation proceeds from step 1236, via connecting node C 1233, to the input of step 1214 for additional monitoring.

Returning to step 1238, in step 1238 right changes or asset ownership changes corresponding to the life event indicated by the user are implemented.

Returning to step 1234, in step 1232 user input is responded to, e.g., access is provided to requested content if the user is authorized to access the requested content. Operation proceeds from step 1232, via connecting node C 1233, to the input of step 1214, for additional monitoring.

Returning to step 1240, in step 1240, it is determined if the other input which was received is document input. If the received input is document input, then operation proceeds from step 1240 to step 1242; otherwise operation proceeds from step 1240 to step 1243, in which received input is processed. Operation proceeds from step 1243. via connecting node C 1233 to the input of step 1214 for additional monitoring.

Returning to step 1242, in step 1242 the document contents are automatically reviewed. Operation proceeds from step 1242 to step 1243.

In step 1243 the document is processed, e.g., the document type, e.g. photo, document invoice, etc., is detected, official certificate identity information, and/or objects are detected and stored in accordance with detected information and/or based on document type. Operation proceeds from step 1244 to step 1246.

In step 1246 it is determined if the document indicates or confirms occurrence of a lifer event, e.g. marriage, divorce, death, birth, etc. If the determination is that the document does not indicate or confirm occurrence of a life event, then operation proceeds from step 1246, via connecting node C 1233, to the input of step 1214 for additional monitoring. However, if the determination is that the document does indicate or confirm occurrence of a life event, then operation proceeds from step 1246, to optional step 1248 or to step 1250. In step 1248, a determination is made as to whether or mot the document is authentic. If the determination is that the document is not authentic, then, operation proceeds from step 1248, via connecting node C 1233 to the input of step 1214 for additional monitoring. However, if the determination is that the document is authentic, then, operation proceeds from step 1248, via connecting node C 1233 to step 1250. In step 1250 rights changes corresponding to the life event indicated in the scanned document are implemented. Operation proceeds from step 1250, via connecting node C 1233, to the input of step 1214 for additional monitoring.

Figure 12:
FIG. 12 shows the steps of a method of processing a physical image in the form of a photo or document to digitize the image and associate tags with the image for storage and to facilitate possible future word based image searching and image retrieval.

FIG. 12 shows the steps of a method of processing a physical image in the form of a photo or document to digitize the image and associate tags with the image for storage and to facilitate possible future word based image searching and image retrieval. The method shown in FIG. 12 may be, and sometimes is, implemented by an appliance such as one of the appliances 108, 111, 200, 300 shown in FIGS. 1, 2 and 3 which can interact with the artificial intelligence systems 97, 98 and/or 99 to provide them scanned images and receive there from reports relating to features recognized in the scanned images. Individual reports received from the AI systems can, and sometimes do, provide a list of features recognized by the system to be in the image and, for each detected feature a list of one or more tags and a confidence level indicating the probability that the feature is in the scanned image which was processed. As will be discussed below, this information can be, and sometimes is, used to determine which tags are associated with an image as part of an automated process that may potentially involve some user input in terms of an operator viewing the scanned document confirming that one or more features are present and/or confirming a tag or synonym of a tag that should be associated with a scanned image that is being stored. Tags may be, and sometimes are, individual words but can also be phrases.

The method 1251 shown in FIG. 12 starts in start step 1252 with a home appliance being powered on and the processor beginning to implement a routine which controls the home appliance 108, 111, 300 or 500 to implement the method shown in FIG. 12. Operation proceeds from step 1252 to scan step 1253 where an image, e.g., a document or photograph, is scanned, e.g., using scanner 318 which may be integrated into the home appliance or attached to the home appliance.

Operation proceeds from scan step 1253 to step 1254 wherein the processor 306 and/or memory 302 of the home appliance, e.g., exemplary appliance 300 receive the scanned image and then communicate it via the interface 304 and/or communications network 104 to the AI systems 97, 98, 99.

The AI systems 97, 98, 99 receive and process the scanned image in steps 1256, 1258, 1260, respectively. The first AI system 97 returns a first set of information 1262 including a list of identified features, a tag or tags for each individual identified feature and a corresponding confidence level that the individual feature is present in the scanned image. The second AI system 98 returns a second set of information 1264 including a list of identified features, a tag or tags for each individual identified feature and a corresponding confidence level that the individual feature is present in the scanned image. The third AI system 99 returns a third set of information 1266 including a list of identified features, a tag or tags for each individual identified feature and a corresponding confidence level that the individual feature is present in the scanned image. Since the different AI systems run different feature recognition algorithms the results provided by the three systems may be different with some of the systems recognizing one or more features which were not recognized by one of the other AI systems 97, 98 or 99.

The results 1262, 1264, 1266 of scanned image analysis are returned from the AI systems 97, 98, 99 to the appliance 108. Steps 1268', 1268", 1268''' represent the home appliance 108 receiving the feature detection results from the AI systems 97, 98, 99 respectively. In some embodiments the results from each AI system are provided in list form for a processed image. The list returned by the AI system includes a list of features which were identified and for each identified feature a detection probability also sometimes referred to as a confidence measure or value and one or more tags corresponding to the identified feature. For example if AI system 1 97 identifies a dog as a first detected feature in a first image that was received form the home appliance it would include in a list that a dog feature was detected, a probability that the dog feature was accurately detected, e.g., a value 0.9 indicating a 90% certainty that the dog feature was present, and one or more tags corresponding to the dog feature such as the word "dog" and/or other terms such as "German Sheppard" or other names for one or more breads of dogs. The list returned by the AI system 97 and received in step 1268' may include other features, a corresponding confidence value for each individual feature and one or more tags for each identified feature.

In step 1269 the home appliance identifies consensus features, e.g., one or more features which were individual identified by more than one of the various AI systems 97, 98, 99, e.g., features that the AI systems agree are present in the scanned image. Consensus of the AI systems maybe and sometimes is evidenced by multiple AI systems identifying the same feature, e.g., a "dog feature". In step 1269 the features in the results 1262, 1264 and 1266 are compared and features which were identified by each of the AI systems are identified as consensus features when multiple AI systems agree that these features are present. For each identified consensus feature the corresponding confidence level provided by each AI system and tags are supplied to step 1270. In step 1270 an overall confidence level is determined, e.g., by the home appliance 108, for each individual consensus feature based on the probabilities returned by each of the multiple AI systems 97, 98, 99 that detected the feature in the scanned image being processed.

Figure 13:
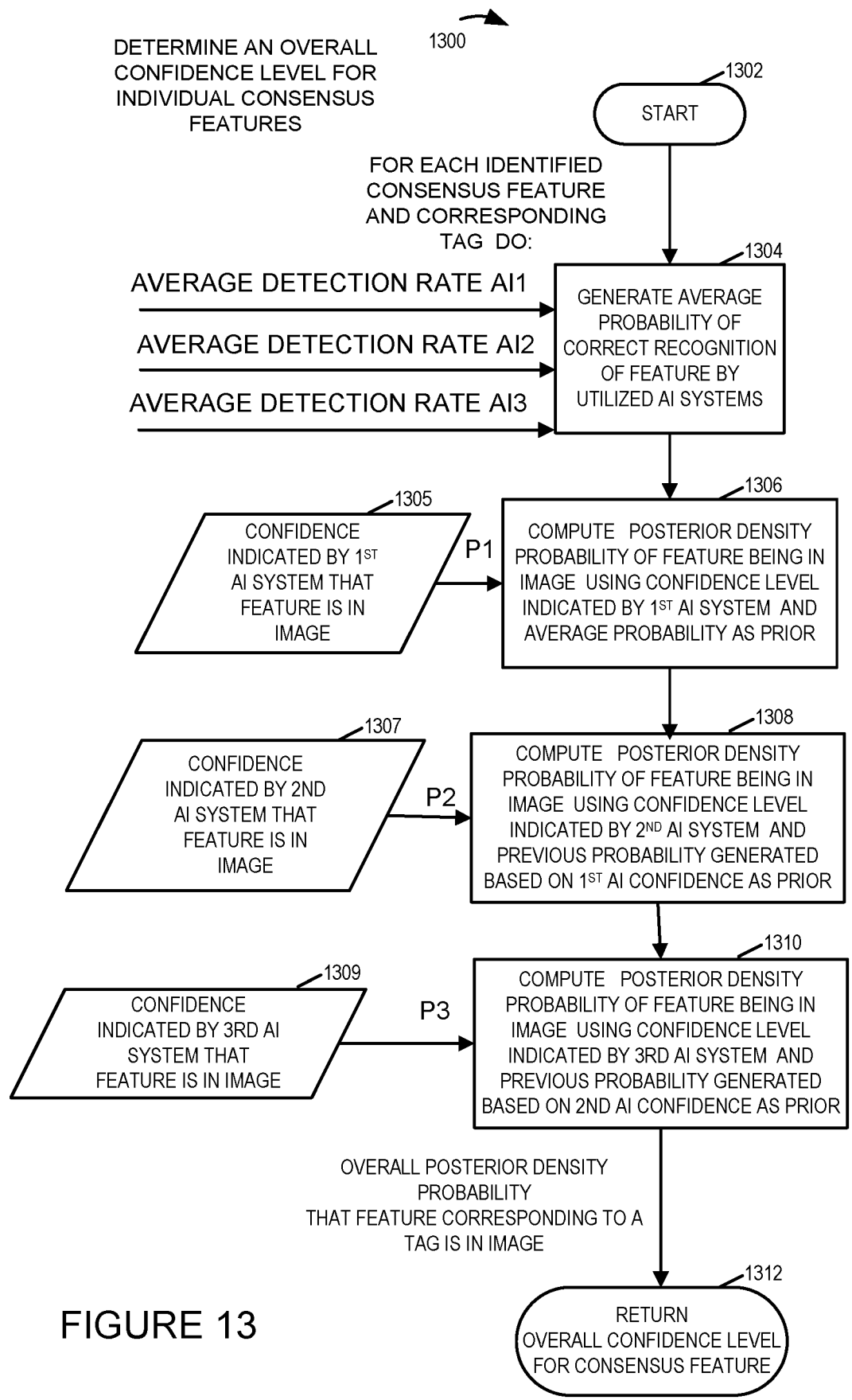
FIG. 13 shows the steps of a method of using information from multiple artificial intelligence systems to identify one or more features in a scanned image and determine an overall confidence level for one or more individual features based on information provided by multiple artificial intelligence systems to which Bayesian inference analysis is applied.

Step 1270 may be, and sometimes is, implemented by the processor of the appliance making a call to a overall confidence level determination subroutine such as the one shown in FIG. 13 to which the consensus feature information is supplied for processing.

In other embodiments the overall confidence level for a particular consensus feature may be and sometimes is generated by forming a simple average or a weighted average of the probability, e.g., confidence, values returned by the systems which detected the particular feature.

The method 1300 of determining an overall confidence level for a consensus feature will now be discussed with reference to FIG. 13. The method 1300 starts in step 1302 when the routine is called, e.g., by the method 1251 shown in FIG. 12. Each consensus feature is processed independently with the process proceeding from step 1302 to step 1304 for each identified consensus feature. Thus the processing shown in steps 1304 to 1312 will be performed for each consensus feature.

In step 1304 the average feature detection rates for each of the AI systems AI 1 97, AI 2 98 and AI 3 99 which detected the consensus feature and returned results are taken into consideration and averaged to generate an average detection rate that serves as an prior input to step 1306 as part of a Bayesian inference process. The average feature detection rates are, in some embodiments, rates based on past testing and not based on the processing of the scanned image. Such rates are considered prior knowledge that can be used as an input to a Bayesian process, where the probability is updated based on the confidence level reported by one or more AI systems that the consensus feature to which the processing in steps 1304 to 1310 relates was actually detected.

In step 1306 a first posterior density probability is generated from the average probability supplied by step 1304 and the confidence 1305 indicated by the first AI system 97 that the feature to which the processing relates was detected by the first AI system 97 in the scanned image.

The probability generated in step 1306 is supplied as a prior to step 1308 which also receives the probability that the consensus feature was detected by the second AI system 98. In step 1308 a second posterior density probability is generated from the posterior density probability supplied by step 1306 and the confidence 1307 indicated by the second AI system 98 that the feature to which the processing relates was detected by the second AI system 98 in the scanned image.

The probability generated in step 1308 is then supplied as a prior to step 1310 which also receives the probability that the consensus feature was detected by AI system 99. In step 1310 a third posterior density probability is generated from the posterior density probability supplied by step 1308 and the confidence 1309 indicated by the third AI system 99 that the feature to which the processing relates was detected by the third AI system 99 in the scanned image.

The probability generated in step 1310 takes into consideration the probabilities indicated by each of the 3 AI systems (97, 98, 99) that the feature to which the processing relates is in the scanned image and is considered an overall confidence level for the consensus feature. The overall confidence level for the consensus feature to which the processing relates is returned to the processor which called the subroutine 1300 in steps 1312 and can be used, as discussed below to make a decision as to which tag or tags should be associated with an image.

Since steps 1304 to step 1312 are performed for each consensus feature that was detected, at the end of the processing shown in FIG. 13, the apparatus implementing the method will have an overall confidence level for each consensus feature being processed and operation will return to the point from which method 1300 was called.

Referring once again to FIG. 12, at the end of step 1270, the apparatus, e.g., home appliance 108, will have an overall confidence level, e.g., probability, for each individual consensus feature that was identified in step 1269. Operation proceeds from step 1270 to step 1272 in which one or more tags are determined to include in a tag list to be associated with the scanned image. The tag list, in some embodiments, includes at least one tag for each consensus feature having a high level of certainty of being present in the scanned image as evidenced by either: i) having an overall confidence level over a threshold value, e.g., a value which may be a preset value and/or ii) confirmed by a system operator to be present in the scanned image.

In some embodiments whether to include a tag in a tag list corresponding to an image is implemented based on a simple threshold basis with the tag being included in the tag list being created when the overall confidence value corresponding to the feature with which the tag is associated exceeds a threshold level, e.g., a predetermined threshold level. In cases where the overall confidence value exceeds the threshold level the tag and corresponding feature are included in the tag list that is associated with the scanned image. However if the overall confidence value associated with a feature and tag or tags is at or below the threshold, in some embodiments the feature and/or corresponding tags are not included in the tag list for the scanned image.

Figure 14:
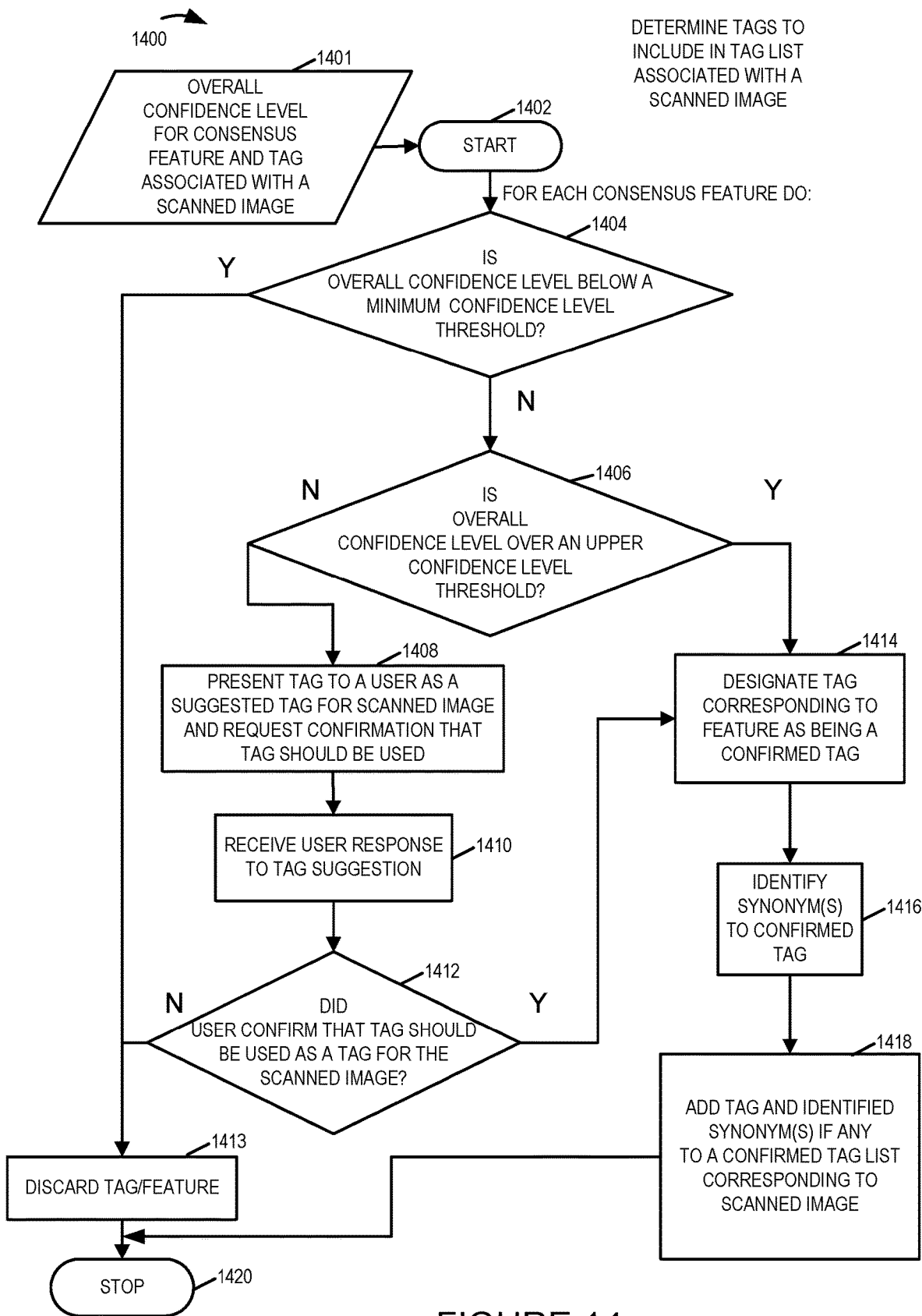
FIG. 14 shows the steps of a method of determine whether a tag or tags should be associated with an image based on results of one or more artificial intelligence feature recognition operations and/or operator input.

More complicated approaches to deciding whether to include a tag in a tag list can be used with, in some embodiments limited user input being used to facilitate the tag association processes. FIG. 14 shows one approach to implementing step 1272 which can involve some user input depending on the embodiment and/or overall confidence level associated with a tag and corresponding identified consensus feature. Accordingly, to facilitate an understanding of invention, FIG. 14 will now be discussed.

The method 1400 shown in FIG. 14, starts in step 1402 in response to a call, e.g., from routine 1251, and with the information 1401 including the overall confidence level information for features and the corresponding tags being supplied to the routine 1400. Steps 1404 to 1418 are performed for each individual consensus feature to determine if the tag or tags corresponding to the feature should be associated with the scanned image.

In step 1404 a determination is made as to whether the overall confidence level corresponding to the feature is below a minimum confidence level threshold, e.g., a threshold indicating that the probability of the feature being present is sufficiently low that the feature should not be associated with the image and thus the tags corresponding to the feature should not be associated with the image. In step 1404 if the overall confidence level of the feature is below the minimum confidence level threshold operation proceeds from step 1404 to discard tag/feature step 1413. In step 1413 the tag or tags corresponding to the feature are discarded and the feature and tags will not be associated with the scanned image, e.g., due to the low level of confidence that the feature is in the scanned image. Operation proceeds from step 1413 to step 1420 where processing regarding the individual feature is halted. While the processing of the individual feature in subroutine 1400 stops in step 1420 processing return to the main routine and continue in routine 1251 which called subroutine 1400.

In step 1404 if the decision was that the overall confidence level of the feature was not below the minimum confidence level threshold operation will proceed to step 1406. In step 1406 the overall confidence level is compared to an upper confidence level threshold to determine if it is over the upper confidence level threshold indicating that the feature is highly likely to be in the scanned image. If in step 1406 the overall confidence level of the feature is determined to be over the upper confidence level threshold operation proceeds to step 1414 in which a decision is made to include a tag or tags corresponding to the feature in information being associated with the scanned image as indicated by a decision to designate the tag or tags associated with the feature as confirmed tags, e.g., tags which correspond to a feature confirmed to be in the scanned image and thus which should be associated with the image.

In step 1406 if it was determined that the overall confidence level of the feature did not exceed the upper confidence level threshold, operation proceeds from step 1406 to step 1408 in which an attempt is made to obtain input from a user as to whether or not the feature is present in the scanned image. In step 1408 the tag, e.g., word, identifying the feature, is presented to an operator of the appliance as a suggested tag for the scanned image and the operator, is requested to confirm that the tag should be used with the scanned image. The scanned image may be, and sometimes is, presented to the operator with the tag on a display, e.g. display 204 or display 308, at the time operator of the apparatus is requested to confirm that the tag should be associated with the scanned image.

In step 1410 a user response is received indicating whether the suggested tag should be used, e.g., associated with the scanned image, or not used. If the operator, e.g., person who scanned the image, indicates that the tag should not be used, operation proceeds from step 1412 to discard tag/feature step 1412 and the tag and feature will not be associated with the scanned image. Since the tag corresponds to the feature confirmation of a tag by an operator also servers as human confirmation that the corresponding feature to which the tag relates is in the scanned image.

However, if in step 1412 the user confirms that the tag should be used, e.g., associated with the scanned image because the feature indicated by the tag is in the scanned image, operation proceeds from step 1412 to step 1414.

In step 1414 the tag that was confirmed by the operator is designated as a confirmed tag and operation proceeds from step 1414 to step 1416. In step 1416 a synonym or synonyms corresponding to the confirmed tag are identified, e.g., via a look up of synonyms in a synonym listing stored in memory. While synonyms may be available for some words they may not be available for all words. Accordingly, in step 1416 synonyms will be identified when they exist which will be in the case of many tags. Operation proceeds from step 1416 to step 1418 where the tag or tags, e.g., words, identifying a confirmed feature are added to a confirmed tag list corresponding to the scanned image. In this way the confirmed tag corresponding to a detected feature is associated in memory with the scanned image. Operation proceeds from step 1418 to step 1420 which represents the stopping point of processing performed in method 1400 corresponding to an individual consensus feature. While in some embodiments synonyms are added automatically for confirmed tags, in other embodiments the operator is requested to review the identified synonyms and confirm they should be associated with the scanned image prior to the individual synonyms being associated with the scanned image.

As tags corresponding to different consensus features are processed in the method 1400, tags corresponding to different consensus features are added to the confirmed tag list associated with a scanned image, multiple detected features are automatically associated with the scanned image in a reliable manner.

With the completion of the processing of consensus features in FIG. 14 and the tags to be associated with the scanned image having been determined, operation returns to step 1272 shown in FIG. 12 and then proceeds to step 1274 in which the confirmed tag list associated with the scanned image is stored in memory, e.g. with the scanned image. The tag list may include simply the confirmed tags associated with the scanned images but may and sometimes also does include one or more confirmed features to which one or more listed tags correspond. The tag list and scanned image may be, and in some embodiments is, communicated in step 1276 by the apparatus 300, e.g., home appliance 108, to the secure server 102 for storage. The tag list and scanned image may be and sometimes is also main tined in the memory of the apparatus 300. Thus depending on the embodiment the secure server and/or home appliance may store scanned images and corresponding tag lists that can be used to respond to user word queries seeking images based on the input of a word or words which may be stored in a tag list corresponding to a stored image.

With the tag lists and corresponding scanned images having been stored in the secure server (102) and home appliance (300 or 300), a user can enter one or more words in a query and obtain, as part of a query result, one or more corresponding stored images. In at least some embodiments an image is determined to correspond to a query if a word entered as part of the query is included in the tag list associated with a stored image. For example, a query including the work "dog" would return a query result which includes the first image which was found to include a dog image as a feature and for which the tag "dog" was stored in memory in the tag list corresponding to the image including the dog feature.

Step 1278 relates to the use of the stored set of scanned images and associated tags to respond to a user query which in some embodiments is entered using the keyboard of the home appliance 300 or 108. In step 1278 a search query is received. As noted above the search query maybe and sometimes is a word. The following receipt of the search query in step 1280 a search is conducted using the word received in the query as a search term. The search is conducted by the home appliances either using the stored tag lists included in its memory or by communicating the word to be use in the search to the secure server which includes the tag lists and images. Thus, depending on the embodiment the search performed in 1280 can be conducted at the home appliance 300, 108 or at the secure server. As part of conducting the search, the word in the query is compared to tags in the stored tag lists and stored scanned images having a tag matching the word being searched are returned in response to the query. In step 1282 the home appliance and/or secure server which implemented the search responds by providing the user the scanned image or images having a tag corresponding to the searched word or words. The home appliance displays in step 1282 the image or images returned as search results thereby providing the user of the appliance 300 or 108 a response to the query.

Having responded to a query operation is shown as stopping in step 1284 but it should be appreciated that the steps of FIG. 12 can be used to process additional images and/or quires on an as needed basis in response to a user scanning images using the home appliance 300 or 108 or entering an image search query into the home appliances 300 or 108.

In step 1278 a device, e.g., the secure server 102 or appliance 300, receiving a search query response to the search query including a word matching a tag associated with the scanned image by providing the scanned image, e.g., to a display or device which is used to present the scanned image to the person who entered the query. As should be appreciated when the person who entered the query is the operator of the appliance, the appliance or server 102 will respond to the query by providing the scanned image having an associated tag matching the search term and causing the image to be displayed on a display to the operator who entered the query.

The method stops in steps 1280 with the system, appliance or devices being used to implement the method 1251 being powered down.

In view of the above, it should be appreciated that the appliance of the present invention offers numerous advantages over personal computer based systems and/or dedicated health care or photo scanning systems.

Figure 15:
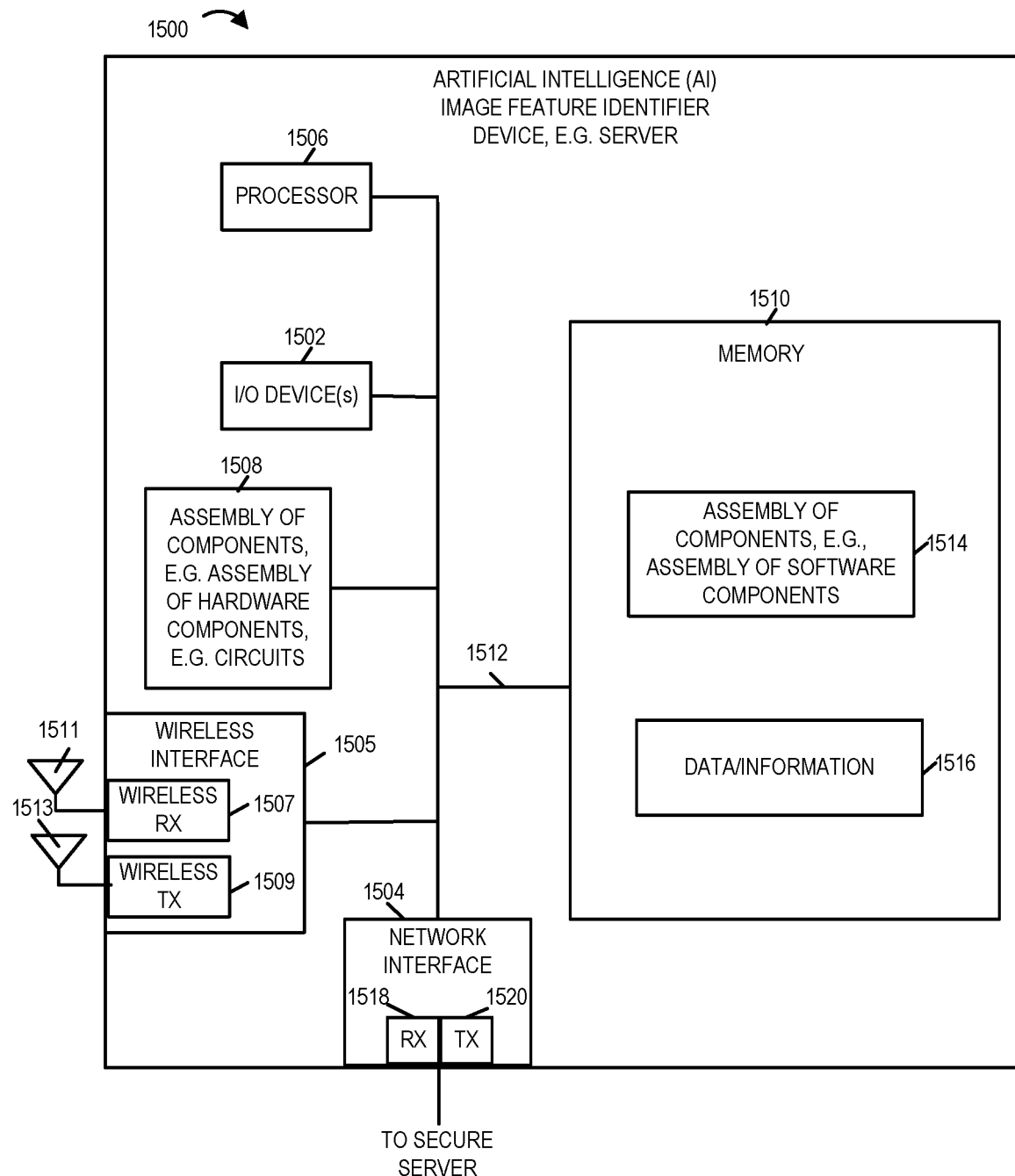
FIG. 15 illustrate an exemplary artificial intelligence (AI) image feature identifier device, e.g. server, in accordance with an exemplary embodiment.

FIG. 15 illustrate an exemplary artificial intelligence (AI) image feature identifier device 1500, e.g. server, in accordance with an exemplary embodiment. Exemplary AI image feature identifier device 1500 is, e.g., any of the AI image feature identifiers (AI-1 image feature identifier 97, AI-2 image feature identifier 98, AI-3 image feature identifier 99) of system 100 of FIG. 1.

Exemplary AI image feature identifier 1500 includes I/O device(s) 1502, e.g., a keyboard and a display, a network interface 1504, a wireless interface 1505, a processor 1506, e.g., a CPU, an assembly of components 1508, e.g., an assembly of hardware components, e.g. circuits, an memory 1510 coupled together via a bus 1512 over which the various elements may interchange data and information. Memory 1510 includes an assembly of components 1514, e.g., an assembly of software components, e.g., software routines, software subroutines, software modules and/or apps, and data/information 1516.

Network interface 1504 may, and sometimes does, couples the AI image feature device 1500 to a secure server, the Internet, communications networks, and/or other network nodes, e.g., a household management device at a customer premises. Wireless interface 1505 includes a wireless receiver 1507 coupled to receive antenna 1511 and a wireless transmitter 1509 coupled to transmit antenna 1513. Wireless interface 1505 may, and sometimes does, couples the AI image feature device 1500 to a secure server, the Internet, communications networks, and/or other network nodes, e.g., a household management device at a customer premises.

Figure 16A:
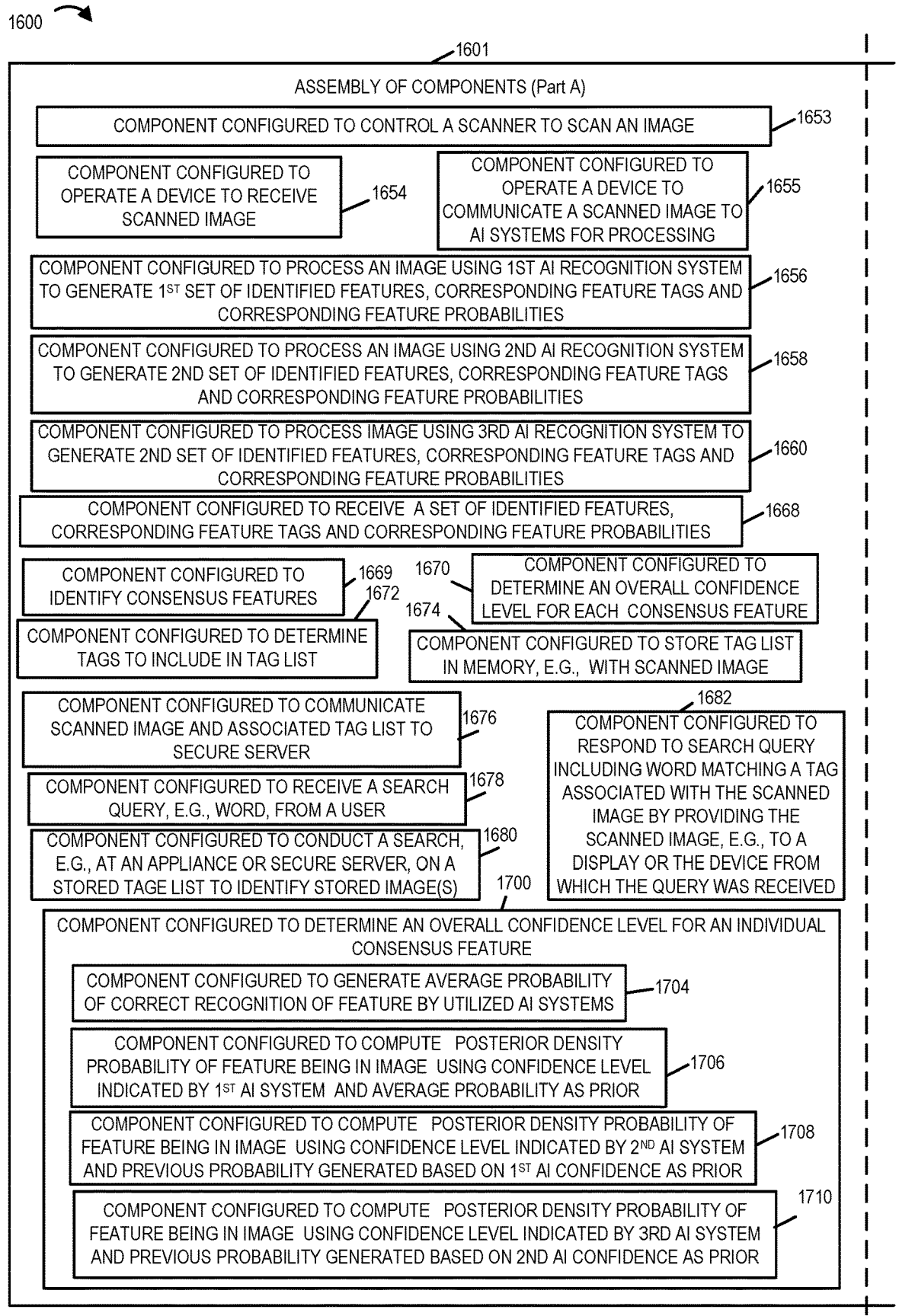
FIG. 16A is a first part of an exemplary assembly of components which may be included in a device in accordance with an exemplary embodiment.
Figures 16, 16B:
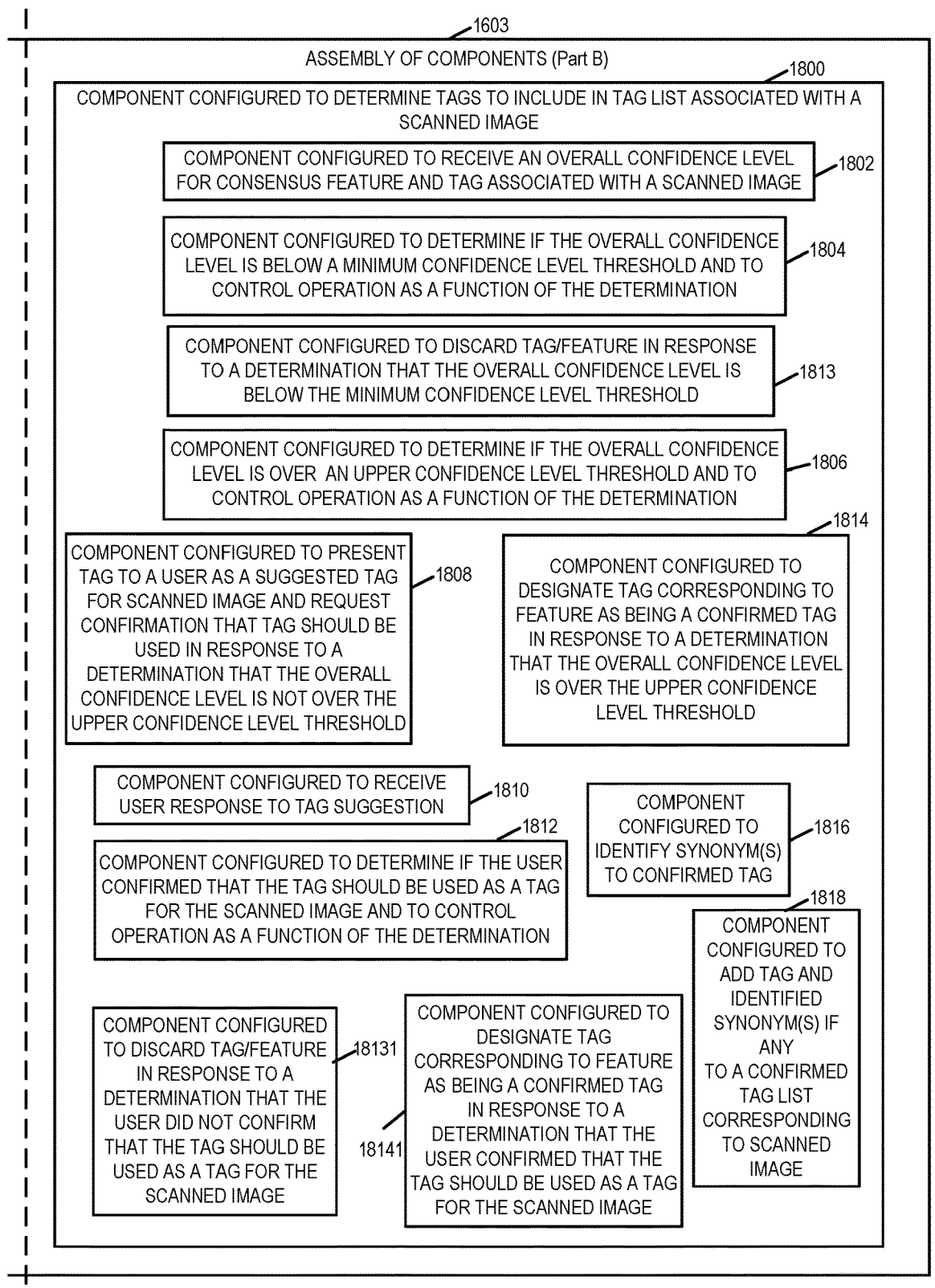
FIG. 16B is a second part of an exemplary assembly of components which may be included in a device in accordance with an exemplary embodiment.
FIG. 16 comprises the combination of FIG. 16A and FIG. 16B.

FIG. 16, comprising the combination of FIG. 16A and FIG. 16B, is a drawing of an exemplary assembly of components 1600, comprising the combination of Part A 1601 and Part B 1603, which may be included in a device or combination of devices, e.g. secure server, a household appliance, and/or one or more artificial intelligence image feature identifier device(s), in accordance with an exemplary embodiment.

FIG. 16 is a drawing of an assembly of components 1600, which may be included in a device(s), e.g., an appliance in a home and/or in a secure server and/or in artificial intelligence image feature identifier device(s), in accordance with an exemplary embodiment.

In some embodiments, a device including one or more or all of the components in assembly of components 1600 is an appliance in a home, for example, the appliance is one of appliance 108 or 111 or FIG. 1, appliance 200 of FIG. 2, appliance 300 of FIG. 3, appliance 472 of FIG. 4, appliance 500 of FIG. 5, and/or appliance 600 of FIG. 6. In embodiments, the device includes or is coupled to one or more AI feature identifier(s).

In some embodiments, a device including on or more or all of the components in assembly of components 1600 is a secure server, e.g. secure server 102, secure server 402 or secure server 900, which receives user and document input from a home management appliance or one or more other devices, e.g., device 470, which include or are coupled to a scanner, e.g. scanner 510. In some embodiments, the secure server 102 includes or is coupled to one or more AI feature identifier(s).

In some embodiments, a device including some of the components in assembly of components 1600 is an artificial intelligence (AI) feature identifier device, e.g. any of AI features Identifiers 97, 98, 99 of FIG. 1 or AI feature identifier device 1500 of FIG. 15.

The components in the assembly of components 1600 can, and in some embodiments are, implemented fully in hardware within a processor, e.g., processor 306 or 906 or 1506, e.g., as individual circuits. The components in the assembly of components 1600 can, and in some embodiments are, implemented fully in hardware within the assembly of hardware components 352 or 908 or 1508, e.g., as individual circuits corresponding to the different components. In other embodiments some of the components are implemented, e.g., as circuits, within processor 306 or 906 or 1506 with other components being implemented, e.g., as circuits within assembly of components 352 or 908 or 1508, external to and coupled to the processor 306 or 906 or 1506. As should be appreciated the level of integration of components on the processor and/or with some components being external to the processor may be one of design choice. Alternatively, rather than being implemented as circuits, all or some of the components may be implemented in software and stored in the memory 302 or 912 or 1510 of the device 300 or 900 or 1500, with the components controlling operation of device 300 or 900 or 1500 to implement the functions corresponding to the components when the components are executed by a processor e.g., processor 306 or 906 or 1506. In some such embodiments, the assembly of components 1600 is included in the memory 302 or 912 or 1510 as part of assembly of software components 354 or 913 or 1514. In still other embodiments, various components in assembly of components 1600 are implemented as a combination of hardware and software, e.g., with another circuit external to the processor providing input to the processor which then under software control operates to perform a portion of a component's function.

When implemented in software the components include code, which when executed by a processor, e.g., processor 306 or 906 or 1506, configure the processor to implement the function corresponding to the component. In embodiments where the assembly of components 1600 is stored in the memory 302 or 912 or 1510, the memory 302 or 912 or 1510 is a computer program product comprising a computer readable medium comprising code, e.g., individual code for each component, for causing at least one computer, e.g., processor 306 or 906 or 1506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 16 control and/or configure the device 300 or 900 or 1500 or elements therein such as the processor 306 or 906 or 1506, to perform the functions of corresponding steps illustrated and/or described in the method of one or more of the flowcharts, signaling diagrams and/or described with respect to any of the Figures. Thus the assembly of components 1600 includes various components that perform functions of corresponding one or more described and/or illustrated steps of an exemplary method, e.g., the method of flowchart 1251 of FIG. 12, the flowchart 1300 of FIG. 13 and the flowchart 1400 of FIG. 14.

Assembly of components 1600 includes a component 1653 configured to control a scanner to scan an image, a component 1654 configured to operate a device to receive a scanned image, a component 1655 configured to operate a device to communicate a scanned image to AI systems for processing, a component 1656 configured to process an image using a 1st. AI recognition system to generate a 1st set of identified features, corresponding feature tags and corresponding feature probabilities, a component 1658 configured to process an image using a 2nd AI recognition system to generate a 2nd set of identified features, corresponding feature tags and corresponding feature probabilities, and a component 1660 configured to process an image using a 3nd AI recognition system to generate a 3rd set of identified features, corresponding feature tags and corresponding feature probabilities.

Assembly of components 1600 further includes a component 1668 configured to receive a set of identified features (e.g., 1st set of identified features from 1st AI, 2nd set of identified features from second AI, or 3rd set of identified features from 3rd AI), corresponding feature tags and corresponding feature probabilities, a component 1669 configured to identify consensus features, a component 1670 configured to determine an overall confidence level for each consensus feature, a component 1672 configured to determine tags to include in a tag list, a component 1674 configured to store the tag list in memory, e.g., with a scanned image, a component 1676 configured to communicate a scanned image and associated tag list to a secure server, a component 1678 configured to receive search query, e.g., word, from a user, a component 1680 configured to conduct a search, e.g., at the appliance or secure server, on a stored tag list to identify stored image(s), and a component 1682 configured to respond to a search query including a word matching a tag associated with a scanned image by providing the scanned image, e.g., to a display or the device from which the query was received.

Assembly of components 1600 further includes a component 1700 configured to determine an overall confidence level for an individual consensus feature. Component 1700 includes a component 1704 configured to generate a probability of correct recognition of a feature by utilized AI systems, a component 1706 configured to compute a posterior density probability of a feature being in an image using confidence level indicated by a 1st AI system and an average probability as prior, a component 1708 configured to compute a posterior density probability of a feature being in an image using confidence level indicated by a 2nd AI system and previous probability generated based on 1st AI confidence as prior, a component 1710 configured to compute a posterior density probability of a feature being in an image using confidence level indicated by a 3rd AI system and previous probability generated based on 2nd AI confidence as prior.

Assembly of components 1600 further includes a component 1800 configured to determine tags to include in a tag list associated with a scanned image. Component 1800 includes a component 1802 configured to receive and overall confidence level for a consensus feature and a tag associated with a scanned image, a component 1804 configured to determine if the overall confidence level is below a minimum threshold and to control operation as a function of the determination, a component 1813 configured to discard the tag/feature in response to a determination that the overall confidence level is below the minimum confidence threshold level, and a component 1806 configured to determine if the overall confidence level is over an upper confidence level threshold and to control operation as a function of the determination. Assembly of components 1800 further includes a component 1808 configured to present a tag to a user as a suggested tag for a scanned image arte request confirmation that the tag should be used in response to a determination that the overall confidence level is not over the upper confidence level threshold but is greater than or equal to the minimum confidence threshold level, a component 1814 configured to designate the tag corresponding to a feature as being a confirmed tag in response to a determination that the overall confidence level is over the upper confidence level threshold, a component 1810 configured to receive user response to a tag suggestion, a component 1812 configured to determine if the user confirmed that the tag should be used as a tag for the scanned image and to control operation as a function of the determination, a component 18131 configured to discard the tag/feature in response to a determination that the user did not confirm that hat the tag should be used as tag for the scanned image, a component 18141 configured to designate the tag and corresponding feature as being confirmed in response to a determination that the user confirmed that the tag should be used as a tag for the scanned image.

Component 1800 further includes a component 1816 configured to identify synonym(s) to a confirmed tag, and a component 1818 configured to add a confirmed tag and identified synonym(s) if any to a confirmed tag list corresponding to the scanned image.

In the following numbered lists, numbered embodiments refer to embodiments in the same list as the claim referring to another, e.g., preceding, numbered embodiment.

First Numbered List of Exemplary Method Embodiments:

Method Embodiment 1 A method comprising: processing (1256) a scanned image using a first artificial intelligence (AI) system to detect features in the scanned image corresponding to word tags and to generate corresponding probabilities that the detected features are present in the scanned image; processing (1258) the scanned image using a second artificial intelligence (AI) system to detect features in the scanned image corresponding to word tags and to generate corresponding probabilities that the detected features are present in the scanned image; identifying (1258) consensus features, consensus features being features detected by multiple AI systems which processed said scanned image; determining (1270), for at least a first identified consensus feature, an overall probability (e.g., overall confidence level), based on a first probability generated by the first AI system for the first consensus feature and on a second probability generated by the second AI system for the first consensus feature; and determining (1272) whether or not to include a tag corresponding to the first consensus feature in a tag list corresponding to the scanned image.

Method Embodiment 2 The method of Method Embodiment 1, wherein determining (1270), for at least a first identified consensus feature, the overall probability includes: computing (1306) a first posterior density probability using as a first input a probability value generated based on an average detection rate with respect to identification of features associated the first artificial intelligence (AI) system and a probability value generated based on an average detection rate with respect to identification of features associated the second artificial intelligence (AI) system and using the probability generated by the first AI system for the first consensus feature as a second input.

Method Embodiment 3 The method of Method Embodiment 2, wherein determining (1270), for at least a first identified consensus feature, the overall probability further includes: computing (1308) a second posterior density probability using as a first input the first posterior density probability and using the probability generated by the second AI system for the first consensus feature as a second input.

Method Embodiment 4 The method of Method Embodiment 3, wherein determining (1270), for at least a first identified consensus feature, the overall probability further includes: computing (1310) a third posterior density probability using as a first input the second posterior density probability and using the probability generated by the third AI system for the first consensus feature as a second input.

Method Embodiment 5 The method of Method Embodiment 4, further comprising: using said third posterior density as the overall probability for the first consensus feature.

Method Embodiment 6 The method of Method Embodiment 5, further comprising: storing (1274) the tag list associated with the scanned image; and using (1278) the stored tag list to determine if a word in a search corresponds to the scanned image.

Method Embodiment 7 The method of Method Embodiment 6, further compressing: responding (1278) to a search by providing the scanned image to a display and displaying the image.

Second Numbered List of Exemplary Method Embodiments:

Method Embodiment 1. A method of processing one or more images, the method comprising: processing (1256) (e.g., at a first feature detection system such as a first network based AI system (97) or performing the processing at the home appliance (108) using a first feature detection module) a scanned image using a first artificial intelligence (AI) system (97) to detect features in the scanned image corresponding to word tags and to generate corresponding probabilities that the detected features are present in the scanned image; processing (1258) (e.g., at a second feature detection system such as a second network based AI system (98) or performing the processing at the home appliance using a second feature detection module) the scanned image using a second artificial intelligence (AI) system (98) to detect features in the scanned image corresponding to word tags and to generate corresponding probabilities that the detected features are present in the scanned image; identifying (1269) (e.g. at a customer premises device such as customer/home management appliance (108) or secure server (102)) consensus features in the scanned image, consensus features being features detected by multiple AI systems (97, 98 and/or 99) which processed said scanned image (where identifying (1269) consensus features in some embodiments includes examining a feature, e.g., a first feature identified by the first AI system to determine if the same feature was also identified by the second and/or third AI system with the first feature being identified as a consensus feature in response to determining that it was identified by two and in some but not all cases 3 of the AI systems); determining (1270), (e.g. at a customer premises device such as customer/home management appliance (108) or secure server (102)) for at least a first identified consensus feature, an overall probability (e.g., overall confidence level), based on a first probability generated by the first AI system (97) for the first consensus feature and on a second probability generated by the second AI system (98) for the first consensus feature (e.g., in some embodiments the overall confidence level for the first identified consensus features is a weighted sum of the probability and/or confidence level indicated by each AI system which identified the feature. However in other embodiments the overall probability is generated from one or more posterior density probabilities); and determining (1272) (e.g. at a customer premises device such as customer/home management appliance (108) or secure server (102)) whether or not to include a tag corresponding to the first consensus feature in a tag list corresponding to the scanned image.

Method Embodiment 1A. The method of Method Embodiment 1, wherein said determining an overall probability includes generating an average probability for a first feature identified by multiple AI systems by summing probabilities indicated by each AI system that the feature was present in and dividing by the number of probabilities that are combined, —for Example if AI system 1 returned probability P1 for feature 1 and AI system 2 returned probability P2 for feature 1 and AI system 3 returned probability P3 for feature 1 the overall probability for feature 1 can be determined by the equation (P1+P2+P3)/3. In some cases the probabilities P1, P2 and P3 may be weighted prior to combining, e.g., by weights that may be predetermined and reflect the known reliability of various AI systems used to detect features. In some cases the weight corresponding to an AI system is based on the average detection rate of the AI system or based on average detection rates of the AI system being used. In one such embodiment the overall probability for feature 1 is determined by the equation overall probability of feature 1—(W1P1+W2P2+W3P3)/3 where W1 is a weight indicative of the reliability of the AI system 1 which detected feature 1 and provided probability P1 as a confidence level of detecting feature 1, where W2 is a weight indicative of the reliability of the AI system 2 which detected feature 1 and provided probability P2 as a confidence level of detecting feature 1, and where W3 is a weight indicative of the reliability of the AI system 3 which detected feature 1 and provided probability P3 as a confidence level of detecting feature 1).

Method Embodiment 1B. The method of Method Embodiment 1 or 1A, wherein determining (1272) (e.g. at a customer premises device such as customer/home management appliance (108) or secure server (102)) whether or not to include a tag corresponding to the first consensus feature in a tag list corresponding to the scanned image includes determining if the overall probability for the first consensus features exceeds a threshold; including the tag corresponding to the first consensus feature in the tag list when the overall probability for the first consensus feature exceeds the threshold; and not including the tag corresponding to the first consensus feature in the tag list when the overall probability for the first consensus feature is equal to or below the threshold.

Method Embodiment 1C. The method of Method Embodiment 1B, wherein said threshold in some embodiments is a predetermined probability threshold (e.g. a 70% probability threshold) of the feature corresponding to the threshold being present in the first image.

Method Embodiment 2. The method of Method Embodiment 1, wherein determining (1270) (e.g. at a customer premises device such as customer/home management appliance (108) or secure server (102)) for at least a first identified consensus feature, the overall probability includes: computing (1306) (e.g. at a customer premises device such as customer/home management appliance (108) or secure server (102)) a first posterior density probability using as a first input a probability value generated based on an average detection rate with respect to identification of features associated the first artificial intelligence (AI) system (97) and a probability value generated based on an average detection rate with respect to identification of features associated the second artificial intelligence (AI) system (98) and using the probability generated by the first AI system (97) for the first consensus feature as a second input.

Method Embodiment 3. The method of Method Embodiment 2, wherein determining (1270) (e.g. at a customer premises device such as customer/home management appliance (108) or secure server (102)), for at least a first identified consensus feature, the overall probability further includes: computing (1308)) (e.g. at a customer premises device such as customer/home management appliance (108) or secure server (102)), a second posterior density probability using as a first input the first posterior density probability and using the probability generated by the second AI system (98) for the first consensus feature as a second input.

Method Embodiment 4. The method of Method Embodiment 3, wherein determining (1270) (e.g. at a customer premises device such as customer/home management appliance (108) or secure server (102, for at least a first identified consensus feature, the overall probability further includes: computing (1310) (e.g. at a customer premises device such as customer/home management appliance (108) or secure server (102)) a third posterior density probability using as a first input the second posterior density probability and using the probability generated by the third AI system (99) for the first consensus feature as a second input.

Method Embodiment 5. The method of Method Embodiment 4, further comprising: using (e.g. at a customer premises device such as customer/home management appliance (108) or secure server (102) said third posterior density as the overall probability for the first consensus feature.

Method Embodiment 5AA. The method of Method Embodiment 1, wherein the first (97) and second (98) artificial intelligence (AI) systems (e.g. an Internet accessible Google image feature recognition system, an Internet accessible Microsoft image feature recognition system and a third party provider system) are different Internet based systems, the method further comprising: sending (1255), from the home appliance (108) the first scanned image to the first AI (97) and second AI systems (98) via an Internet communications network (104).

Method Embodiment 5A. The method of Method Embodiment 1, wherein the first AI system (97) is a computer system that was trained on a first set of training data including a first set of images, images in said first set of images including one or more known features, a tag being associated with each known feature.

Method Embodiment 5B. The method of Method Embodiment 5A, wherein the first AI system (97) is a first cloud based system, the method further comprising: communicating (1255) the scanned image via a communications network ((e.g., potentially via secure server (102)) from a customer premise device (e.g., customer/home management appliance (108)) which receives images and provides in response to each received images one or more tags with a confidence level to the first AI system (97).

Method Embodiment 5C. The method of Method Embodiment 5A, further comprising: receiving (1268') information indicating features identified by the first AI system with corresponding tags and confidence levels (e.g., for each feature that was identified, the feature is indicated in a list, a corresponding confidence metric, e.g., detection probability is provided in the list, and one or more tags corresponding to the feature are provided in the list that is received); receiving (1268") information indicating features identified by the second AI system with corresponding tags and confidence levels (e.g., for each feature that was identified by the second AI system, the feature is indicated in a list received from the second AI system with a corresponding confidence metric (e.g., detection probability is provided in the list), and one or more tags corresponding to the feature are provided in the list that is received from the second AI system); and receiving (1268''') information indicating features identified by the third AI system with corresponding tags and confidence levels (e.g., for each feature that was identified by the third AI system, the feature is indicated in a list received from the third AI system with a corresponding confidence metric (e.g., detection probability is provided in the list), and one or more tags corresponding to the feature are provided in the list that is received from the third AI system).

Method Embodiment 6. The method of Method Embodiment 5, further comprising: storing (1274) the tag list associated with the scanned image (e.g., in the secure server 102 or memory of the home appliance 108).

Method Embodiment 7. The method of Method Embodiment 6, further comprising: receiving (1278) a query from a user (e.g., user of home appliance (108)); and using (1280) the stored tag list to determine if a word in a search corresponds to the scanned image.

Method Embodiment 8. The method of Method Embodiment 7, further compressing: responding (1282) to a search by providing the scanned image to a display and displaying the image.

Method Embodiment 9. The method of Method Embodiment 1, wherein the first (97) and second (98) artificial intelligence (AI) systems are different Internet based systems, the method further comprising: sending (1255), from the home appliance (108) the first scanned image to the first AI (97) and second AI systems (98) via an Internet communications network (104).

First Numbered List of Exemplary Apparatus Embodiments:

Apparatus Embodiment 1. A an apparatus (300 or 900) for processing one or more images, the apparatus comprising: a receiver (356, 360, 914 or 918) configured to receive: i) first information indicating a first list of features detected by a first feature detection system (97) to be present in a scanned image and corresponding probabilities that the detected features are present in the scanned image and ii) second information indicating a second list of features detected by a second feature detection system (98) to be present in the scanned image; memory (302 or 912) storing said first and second information (323) and said scanned image (327); and a processor (306 or 906), configured to control the apparatus (300 or 108) to: identify (1269) (e.g. at a customer premises device such as customer/home management appliance (108) or secure server (102)) consensus features in the scanned image, consensus features being features detected by multiple AI systems (97, 98 and/or 99) which processed said scanned image (where identifying (1269) consensus features in some embodiments includes examining a feature, e.g., a first feature identified by the first AI system to determine if the same feature was also identified by the second and/or third AI system with the first feature being identified as a consensus feature in response to determining that it was identified by two and in some but not all cases 3 of the AI systems); determine (1270), (e.g. at a customer premises device such as customer/home management appliance (108) or secure server (102)) for at least a first identified consensus feature, an overall probability (e.g., overall confidence level), based on a first probability generated by the first AI system (97) for the first consensus feature and on a second probability generated by the second AI system (98) for the first consensus feature (e.g., in some embodiments the overall confidence level for the first identified consensus features is a weighted sum of the probability and/or confidence level indicated by each AI system which identified the feature. However in other embodiments the overall probability is generated from one or more posterior density probabilities); and determine (1272) (e.g. at a customer premises device such as customer/home management appliance (108) or secure server (102)) whether or not to include a tag corresponding to the first consensus feature in a tag list corresponding to the scanned image.

Apparatus Embodiment 1A. The apparatus (300 or 900) of Apparatus Embodiment 1, wherein said processor (306 or 906) is configured, as part of determining an overall probability to: generate an average probability for a first feature identified by multiple AI systems by summing probabilities indicated by each AI system that the feature was present in and dividing by the number of probabilities that are combined, —for Example if AI system 1 returned probability P1 for feature 1 and AI system 2 returned probability P2 for feature 1 and AI system 3 returned probability P3 for feature 1 the overall probability for feature 1 can be determined by the equation (P1+P2+P3)/3. In some cases the probabilities P1, P2 and P3 may be weighted prior to combining, e.g., by weights that may be predetermined and reflect the known reliability of various AI systems used to detect features. In some cases the weight corresponding to an AI system is based on the average detection rate of the AI system or based on average detection rates of the AI system being used. In one such embodiment the overall probability for feature 1 is determined by the equation overall probability of feature 1—(W1P1+W2P2+W3P3)/3 where W1 is a weight indicative of the reliability of the AI system 1 which detected feature 1 and provided probability P1 as a confidence level of detecting feature 1, where W2 is a weight indicative of the reliability of the AI system 2 which detected feature 1 and provided probability P2 as a confidence level of detecting feature 1, and where W3 is a weight indicative of the reliability of the AI system 3 which detected feature 1 and provided probability P3 as a confidence level of detecting feature 1).

Apparatus Embodiment 1B. The apparatus (300 or 900) of Apparatus Embodiment 1 or 1A, wherein the processor (306 or 906) is configured to control the apparatus to: determine (1272) (e.g. at a customer premises device such as customer/home management appliance (108) or secure server (102)) whether or not to include a tag corresponding to the first consensus feature in a tag list corresponding to the scanned image includes determining if the overall probability for the first consensus features exceeds a threshold; including the tag corresponding to the first consensus feature in the tag list when the overall probability for the first consensus feature exceeds the threshold; and not including the tag corresponding to the first consensus feature in the tag list when the overall probability for the first consensus feature is equal to or below the threshold.

Apparatus Embodiment 1C. The apparatus (300 or 900) of Apparatus Embodiment 1B, wherein said threshold in some embodiments is a predetermined probability threshold (e.g. a 70% probability threshold) of the feature corresponding to the threshold being present in the first image.

Apparatus Embodiment 2. The apparatus (300 or 900) of Apparatus Embodiment 1, wherein the processor (306 or 906) is configured, as part of determining (1270) (e.g. at a customer premises device such as customer/home management appliance (108) or secure server (102)) for at least a first identified consensus feature, the overall probability to control the apparatus to: compute (1306) (e.g. at a customer premises device such as customer/home management appliance (108) or secure server (102)) a first posterior density probability using as a first input a probability value generated based on an average detection rate with respect to identification of features associated the first artificial intelligence (AI) system (97) and a probability value generated based on an average detection rate with respect to identification of features associated the second artificial intelligence (AI) system (98) and using the probability generated by the first AI system (97) for the first consensus feature as a second input.

Apparatus Embodiment 3. The apparatus (300 or 900) of Apparatus Embodiment 2, wherein the processor (306 or 906) is further configured, as part of controlling the apparatus to determine (1270) (e.g. at a customer premises device such as customer/home management appliance (108) or secure server (102)), for at least a first identified consensus feature, the overall probability to control the apparatus to: compute (1308)) (e.g. at a customer premises device such as customer/home management appliance (108) or secure server (102)), a second posterior density probability using as a first input the first posterior density probability and using the probability generated by the second AI system (98) for the first consensus feature as a second input.

Apparatus Embodiment 4. The apparatus (300 or 900) of Apparatus Embodiment 3, wherein the processor (306 or 906) is further configured, to control the apparatus as part of determining (1270) (e.g. at a customer premises device such as customer/home management appliance (108) or secure server (102, for at least a first identified consensus feature, the overall probability to: compute (1310) (e.g. at a customer premises device such as customer/home management appliance (108) or secure server (102)) a third posterior density probability using as a first input the second posterior density probability and using the probability generated by the third AI system (99) for the first consensus feature as a second input.

Apparatus Embodiment 5. The apparatus (300) of Apparatus Embodiment 4, further comprising: operating the processor (306) to control the apparatus (300) to: use (e.g. at a customer premises device such as customer/home management appliance (108) or secure server (102)) said third posterior density as the overall probability for the first consensus feature.

Apparatus Embodiment 5AA. The apparatus (300) of Apparatus Embodiment 1, wherein the first (97) and second (98) feature detection systems (e.g. an Internet accessible Google image feature recognition system, an Internet accessible Microsoft image feature recognition system and a third party provider system) are different Internet based systems, the apparatus further comprising: a transmitter (358 or 362) for sending (1255), from the home appliance (108) the first scanned image to the first AI (97) and second AI systems (98) via an Internet communications network (104).

Apparatus Embodiment 5A. The apparatus (300 or 900) of Apparatus Embodiment 1, wherein the first feature recognition system (97) is a computer system that was trained on a first set of training data including a first set of images, images in said first set of images including one or more known features, a tag being associated with each known feature.

Apparatus Embodiment 5B. The apparatus (300) of Apparatus Embodiment 5A, wherein the first feature recognition system (97) is a first cloud based system; and wherein the processor (306) is further configured to control the apparatus (300) to: communicate (1255) the scanned image via a communications network ((e.g., potentially via secure server (102)) from a customer premise device (e.g., customer/home management appliance (108)) which receives images and provides in response to each received images one or more tags with a confidence level to the first AI system (97).

Method Embodiment 5C. The apparatus (300) of Apparatus Embodiment 5A, wherein the receiver (356 or 360) is further configured to: receive (1268') information indicating features identified by the first feature recognition system with corresponding tags and confidence levels (e.g., for each feature that was identified, the feature is indicated in a list, a corresponding confidence metric, e.g., detection probability is provided in the list, and one or more tags corresponding to the feature are provided in the list that is received); receive (1268") information indicating features identified by the second feature recognition system with corresponding tags and confidence levels (e.g., for each feature that was identified by the second AI system, the feature is indicated in a list received from the second AI system with a corresponding confidence metric (e.g., detection probability is provided in the list), and one or more tags corresponding to the feature are provided in the list that is received from the second AI system); and receive (1268''') information indicating features identified by the third feature recognition system with corresponding tags and confidence levels (e.g., for each feature that was identified by the third AI system, the feature is indicated in a list received from the third AI system with a corresponding confidence metric (e.g., detection probability is provided in the list), and one or more tags corresponding to the feature are provided in the list that is received from the third AI system).

Apparatus Embodiment 6. The apparatus (300) of Apparatus Embodiment 5, wherein the memory (302) stores (1274) the tag list (325) associated with the scanned image (e.g., in the secure server 102 or memory of the home appliance 108).

Apparatus Embodiment 7. The apparatus (300) of Apparatus Embodiment 6, further comprising: a user input device (310) configured to receive (1278) a query from a user (e.g., user of home appliance (108)); and wherein the processor is further configured to: use (1280) the stored tag list (325) to determine if a word in a search corresponds to the scanned image.

Apparatus Embodiment 8. The apparatus (300) of Apparatus Embodiment 7, wherein the processor is further configured to control the apparatus (300 or 108) to: respond (1282) to a search by providing the scanned image to a display (308) and display the image.

Third Numbered List of Method Embodiments

Method Embodiment 1. A method of operating a customer premises device (e.g., home appliances 108 or 300) to associate tags with a scanned image, the method comprising: i) generating (1270)) a confidence level indicating a level of confidence with respect to a first feature being in a scanned image (e.g., generate an overall confidence value which is the confidence level based on received confidence values from multiple AI systems which detected a feature in the scanned image) or ii) receiving (1402) (e.g., from a network based feature recognition system 97, 98 or 99 in which case a single confidence value received from a single AI system is used as an overall confidence level instead of an overall confidence value generated from the output of multiple feature recognition systems) the confidence level indicating a level of confidence with respect to a first feature being in a scanned image; determining (1406) if the confidence level is over an upper confidence level threshold; and associating (1418) a word corresponding to the first feature with the scanned image as a first tag when the confidence level is determined to be over the upper confidence level threshold.

Method Embodiment 2. The method of Method Embodiment 1, further comprising: presenting (1408) the word to a user as a suggested tag for the scanned image when the confidence level is below the upper confidence level threshold and above a minimum threshold level.

Method Embodiment 3. The method of Method Embodiment 2, further comprising: receiving (1410) a user response to the tag suggestion; and i) discarding (1413) the suggested tag when the user does not confirm that the tag should be used for the scanned image; and ii) designating (1414) the tag as a confirmed tag when user confirms that the tag should be used and associating (1418) the word to be used as a tag with the scanned image.

Method Embodiment 4. The method of Method Embodiment 3, further comprising: identifying (1416) one or more synonyms corresponding to a user confirmed tag or tag automatically associated with the scanned image; and associating (1418) the identified one or more synonyms with the scanned image.

Method Embodiment 5. The method of Method Embodiment 4, further comprising: receiving (1402) a second confidence level indicating a level of confidence with respect to an additional feature being in the scanned image; determining (1406) if the second confidence level is over the upper confidence level threshold; and associating (1418) a word corresponding to the additional feature with the image as a tag when the confidence level is determined to be over the upper confidence level threshold.

Method Embodiment 6. The method of Method Embodiment 5, further comprising: wherein the confidence level is an overall confidence level generated from confidence levels returned by multiple artificial intelligence systems (e.g., neural network based feature recognition systems).

Second Numbered List of Exemplary Apparatus Embodiments:

Apparatus Embodiment 1. An apparatus (300 or 108) comprising: a receiver (356); memory (302) storing a scanned image; and a processor (306) configured to control the apparatus to: i) generate (1270)) a confidence level indicating a level of confidence with respect to a first feature being in a scanned image (e.g., generate an overall confidence value which is the confidence level based on received confidence values from multiple AI systems which detected a feature in the scanned image) or ii) receive (1402) (e.g., from a network based feature recognition system 97, 98 or 99 in which case a single confidence value received from a single AI system is used as an overall confidence level instead of an overall confidence value generated from the output of multiple feature recognition systems) the confidence level indicating a level of confidence with respect to a first feature being in a scanned image; determine (1406) if the confidence level is over an upper confidence level threshold; and associate (1418), in the memory (302), a word corresponding to the first feature with the scanned image as a first tag when the confidence level is determined to be over the upper confidence level threshold.

Apparatus Embodiment 2. The apparatus (300 or 108) of Apparatus Embodiment 1, wherein the processor (306) is further configured to control the apparatus to: present (1408) the word to a user as a suggested tag for the scanned image when the confidence level is below the upper confidence level threshold and above a minimum threshold level.

Apparatus Embodiment 3. The apparatus (300 or 108) of Apparatus Embodiment 2, wherein the processor (306) is further configured to control the apparatus (300 or 108) to: receive (1410) a user response to the tag suggestion; and i) discard (1413) the suggested tag when the user does not confirm that the tag should be used for the scanned image and ii) designate (1414) the tag as a confirmed tag when user confirms that the tag should be used and associating (1418) the word to be used as a tag with the scanned image.

Apparatus Embodiment 4. The apparatus (300 or 108) of Apparatus Embodiment 3, wherein the processor is further configured to control the apparatus to: identify (1416) one or more synonyms corresponding to a user confirmed tag or tag automatically associated with the scanned image; and associate (1418) the identified one or more synonyms with the scanned image.

Apparatus Embodiment 5. The apparatus (300 or 108) of Apparatus Embodiment 4, wherein the processor (306) is further configured to control the apparatus (300 or 108) to: receive (1402) a second confidence level indicating a level of confidence with respect to an additional feature being in the scanned image; determine (1406) if the second confidence level is over the upper confidence level threshold; and associate (1418) a word corresponding to the additional feature with the image as a tag when the confidence level is determined to be over the upper confidence level threshold.

Apparatus Embodiment 6. The apparatus (300 or 108) of Apparatus Embodiment 5, further comprising: wherein the confidence level is an overall confidence level generated from confidence levels returned by multiple artificial intelligence systems (e.g., neural network based feature recognition systems).

The methods of various embodiments may be implemented using software, hardware and/or a combination of software and hardware. In some embodiments, modules are implemented as physical modules. In some such embodiments, the individual physical modules are implemented in hardware, e.g., as circuits, or include hardware, e.g., circuits, with some software. In other embodiments, the modules are implemented as software modules which are stored in memory and executed by a processor, e.g., general purpose computer. Various embodiments are also directed to machine, e.g., computer, readable medium, e.g., ROM, RAM, CDs, hard discs, etc., which include machine readable instructions for controlling a machine, e.g., processor or computer system, to implement one or more steps of a method.

It is understood that the specific order or hierarchy of steps in the processes disclosed is an example of exemplary approaches. Based upon design preferences, it is understood that the specific order or hierarchy of steps in the processes may be rearranged to some extent while remaining within the scope of the present disclosure.

In various embodiments nodes described herein are implemented using one or more modules to perform the steps corresponding to one or more methods. Thus, in some embodiments various features are implemented using modules. Such modules may be implemented using software, hardware or a combination of software and hardware. Many of the above described methods or method steps can be implemented using machine executable instructions, such as software, included in a non-transitory machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine, e.g., computer, readable medium including machine, e.g., computer, executable instructions for causing a machine, e.g., computer, processor and/or associated hardware, to perform one or more of the steps of the above-described method(s).

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of the method or methods described herein. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Numerous additional variations on the methods and apparatus of the various embodiments described above will be apparent to those skilled in the art in view of the above description. Such variations are to be considered within the scope of the invention.

What is claimed is:

1. A method of processing one or more images, the method comprising:
    processing a scanned image using a first artificial intelligence (AI) system to detect features in the scanned image corresponding to word tags and to generate corresponding probabilities that the detected features are present in the scanned image, said features including a first feature, said first feature being an image of a first object;
    processing the scanned image using a second AI system to detect features in the scanned image corresponding to word tags and to generate corresponding probabilities that the detected features are present in the scanned image;
    identifying consensus features in the scanned image, consensus features being features detected by multiple AI systems which processed said scanned image, said multiple AI systems including at least the first AI system and the second AI system, said consensus features including at least a first consensus feature, said first consensus feature being said first feature;

determining for at least the first identified consensus feature, an overall probability, based on a first probability generated by the first AI system for the first consensus feature and on a second probability generated by the second AI system for the first consensus feature; and determining, based on the overall probability, whether or not to include a first word tag corresponding to the first consensus feature in a tag list corresponding to the scanned image, said first word tag being a word.

2. The method of claim 1, wherein determining for at least the first identified consensus feature, the overall probability includes:

computing a first posterior density probability using as a first input a probability value generated based on an average detection rate with respect to identification of features associated the first AI system and a probability value generated based on an average detection rate with respect to identification of features associated the second AI system and using the probability generated by the first AI system for the first consensus feature as a second input.

3. The method of claim 2, wherein determining for at least the first identified consensus feature, the overall probability further includes:

computing a second posterior density probability using as a first input the first posterior density probability and using the probability generated by the second AI system for the first consensus feature as a second input.

4. The method of claim 3, wherein determining for at least the first identified consensus feature, the overall probability further includes:

computing a third posterior density probability using as a first input the second posterior density probability and using the probability generated by a third AI system for the first consensus feature as a second input.

5. The method of claim 4, further comprising:
using said third posterior density as the overall probability for the first consensus feature.

6. The method of claim 5, further comprising:
storing the tag list associated with the scanned image.

7. The method of claim 6, further comprising:
receiving a query from a user; and
using the stored tag list to determine if a word in a search corresponds to the scanned image.

8. The method of claim 7, further comprising:
responding to a search by providing the scanned image to a display and displaying the image.

9. The method of claim 1, wherein the first and second AI systems are different Internet based systems, the method further comprising:

sending, from a home appliance the first scanned image to the first AI and second AI systems via an Internet communications network.

10. The method of claim 1,
wherein said steps of processing the scanned image using the first AI system and processing the scanned image using the second AI system are performed in parallel, the method further comprising:

receiving at an apparatus in a home, from the first AI system a first set of information indicating features detected in the first image, word tags corresponding to the detected features and probabilities that the detected features are present in the scanned image; and receiving, at the apparatus in the home, from the second AI system a second set of information indicating features detected in the first image by the second AI system, word tags corresponding to the detected features, and probabilities that the detected features are present in the scanned image.

11. The method of claim 10,
wherein the first AI system and second AI system are located outside the home; and
wherein said steps of identifying consensus features in the scanned image, determining for at least a first identified consensus feature an overall probability, and determining whether or not to include a first word tag corresponding to the first consensus feature in a tag list corresponding to the scanned image are performed by said apparatus in the home.

12. The method of claim 1, further comprising:
receiving from the first AI system information indicating the first probability determined by the first AI system that the first feature is present in the scanned image and a word tag provided by the first AI system corresponding to the first feature.

13. The method of claim 1, further comprising:
receiving from the second AI system information indicating the second probability determined by the second AI system that the first feature is present in the scanned image and a word tag provided by the second AI system corresponding to the first feature.

14. The method of claim 13, wherein said object is an image of animal.

15. The method of claim 14 wherein said animal is a dog.

16. The method of claim 15, wherein the first word tag is the word dog.

17. The method of claim 15 wherein said tag list includes multiple words or word phrases corresponding to the first feature, said tag list including the word dog and a name for a breed of dog.

18. An apparatus for processing one or more images, the apparatus comprising:

a receiver configured to receive: i) first information indicating a first list of features detected by a first artificial intelligence (AI) system to be present in a scanned image and corresponding probabilities determined by the first AI system that the detected features are present in the scanned image, said first list of detected features including a first feature, said first feature being an image of a first object; and ii) second information indicating a second list of features detected by a second AI system to be present in the scanned image and corresponding probabilities determined by the second AI system that the detected features are present in the scanned image, said second list of features including the first feature;

memory storing said first and second information and said scanned image; and a processor, configured to control the apparatus to:
identify consensus features in the scanned image, consensus features being features detected by multiple AI systems which processed said scanned image, said multiple AI systems including at least the first AI system and the second AI system, said consensus features including at least a first consensus feature, said first consensus feature being said first feature;

determine for at least the first identified consensus feature, an overall probability, based on a first probability generated by the first AI system for the first consensus feature and on a second probability generated by the second AI system for the first consensus feature; and determine, based on the overall probability, whether or not to include a first word tag corresponding to the first consensus feature in a tag list corresponding to the scanned image, said first word tag being a word.

19. The apparatus of claim 18, wherein the processor is configured, as part of determining, for at least the first identified consensus feature, the overall probability, to control the apparatus to:

compute a first posterior density probability using as a first input, a probability value generated based on an average detection rate with respect to identification of features associated the first AI system and a probability value generated based on an average detection rate with respect to identification of features associated the second AI system and using the probability generated by the first AI system for the first consensus feature as a second input.

20. The apparatus of claim 19, wherein the processor is further configured, as part of controlling the apparatus to determine, for at least the first identified consensus feature, the overall probability, to control the apparatus to:

compute a second posterior density probability using as a first input the first posterior density probability and using the probability generated by the second AI system for the first consensus feature as a second input.

21. The apparatus of claim 20, wherein the processor is further configured to control the apparatus, as part of determining, for at least a first identified consensus feature, the overall probability, to:

compute a third posterior density probability using as a first input the second posterior density probability and using the probability generated by a third AI system for the first consensus feature as a second input.

22. The apparatus of claim 21, wherein said processor is further configured to control the apparatus to:

use said third posterior density as the overall probability for the first consensus feature.

23. The apparatus of claim 22, wherein the memory stores the tag list associated with the scanned image.

24. The apparatus of claim 23, further comprising:

a user input device configured to receive a query from a user; and wherein the processor is further configured to:

use the stored tag list to determine if a word in a search corresponds to the scanned image.

25. The apparatus of claim 24, wherein the processor is further configured to control the apparatus to:

respond to a search by providing the scanned image to a display and display the image.

* * * * *